US012028654B1

(12) United States Patent
Bain et al.

(10) Patent No.: US 12,028,654 B1
(45) Date of Patent: Jul. 2, 2024

(54) SYSTEM AND METHOD FOR GENERATING A PLURALITY OF CELESTIAL IMAGE FEATURES FROM A PLURALITY OF IMAGES OF A SKY

(71) Applicant: NorthStar Earth & Space Inc., Montreal (CA)

(72) Inventors: Stewart Bain, Montreal (CA); Narendra Gollu, Montreal (CA); Peter Klimas, Montreal (CA); Jean-Claude Leclerc, Montreal (CA); Daniel O'Connell, Montreal (CA); Frederic Pelletier, Montreal (CA); Naron Phou, Montreal (CA)

(73) Assignee: NORTHSTAR EARTH & SPACE INC., Montreal (CA)

( * ) Notice: Subject to any disclaimer, the term of this patent is extended or adjusted under 35 U.S.C. 154(b) by 0 days.

(21) Appl. No.: 18/519,991

(22) Filed: Nov. 27, 2023

(51) Int. Cl.
*H04N 7/18* (2006.01)
*B64G 1/10* (2006.01)
(Continued)

(52) U.S. Cl.
CPC ........... *H04N 7/181* (2013.01); *B64G 1/1028* (2023.08); *B64G 1/1085* (2013.01); *G06T 7/80* (2017.01);
(Continued)

(58) Field of Classification Search
CPC ...... B64G 1/10; B64G 1/1021; B64G 1/1028; B64G 1/1078; B64G 1/1081; G06T 2207/10032
See application file for complete search history.

(56) References Cited

U.S. PATENT DOCUMENTS 9,067,693 B2 6/2015 Olivier et al.
9,187,189 B2 11/2015 Griffith, Sr. et al.
(Continued)

FOREIGN PATENT DOCUMENTS

EP 3978372 A4 6/2022
WO 2012021760 A3 2/2012
(Continued)

OTHER PUBLICATIONS

Department of Defense, Navy, "Cellular Base Station for Low Earth Orbit Space Missions," 2 pages (2017).
(Continued)

*Primary Examiner* — Jayanti K Patel
*Assistant Examiner* — Christopher Kingsbury Glover
(74) *Attorney, Agent, or Firm* — Greenberg Traurig, LLP

(57) ABSTRACT

A system includes a plurality of satellites in orbit around a celestial body in a plurality of orbital planes. Each satellite includes an imaging device having a field of view (FOV) to capture an image of a sky that includes celestial image features of resident space object (RSO), stars, and/or planets. The satellite processor is configured to receive image data from sensors in the imaging device, to increase a positional detection accuracy of the celestial image features by defocusing imaging optics of the imaging device, to capture image data in a volume of the sky as the FOV of the imaging device on each satellite moves in an orbital plane, and generate by a centralized computer at least 1,000 celestial image features using the image data transmitted from each of the satellites.

22 Claims, 15 Drawing Sheets

(51) Int. Cl.
*G06T 7/80* (2017.01)
*H04N 23/71* (2023.01)
*H04N 23/72* (2023.01)
*H04N 23/73* (2023.01)
*H04N 23/75* (2023.01)
*H04N 23/90* (2023.01)

(52) U.S. Cl.
CPC ............ *H04N 23/71* (2023.01); *H04N 23/72* (2023.01); *H04N 23/73* (2023.01); *H04N 23/75* (2023.01); *H04N 23/90* (2023.01); *G06T 2207/10032* (2013.01)

(56) References Cited

U.S. PATENT DOCUMENTS

| | | |
|---|---|---|
| 10,402,672 B1 | 9/2019 | Hendrix et al. |
| 10,407,191 B1 | 9/2019 | Hendrix et al. |
| 10,416,862 B1 | 9/2019 | Hendrix et al. |
| 10,467,783 B2 | 11/2019 | Hendrix et al. |
| 10,497,156 B2 | 12/2019 | Hendrix et al. |
| 10,647,453 B2 | 5/2020 | Hendrix et al. |
| 10,661,920 B2 | 5/2020 | Hendrix et al. |
| 10,976,911 B2 | 4/2021 | Hendrix et al. |
| 11,017,571 B2 | 5/2021 | Hendrix et al. |
| 11,378,685 B2 | 7/2022 | Stevenson et al. |
| 11,402,986 B2 | 8/2022 | Hendrix et al. |
| 2007/0150128 A1* | 6/2007 | Fowell .................. B64G 1/244 701/13 |
| 2008/0046138 A1* | 2/2008 | Fowell .................. B64G 1/244 701/13 |
| 2012/0261514 A1* | 10/2012 | Boone ..................... B64G 1/66 244/172.8 |
| 2013/0090787 A1 | 4/2013 | Ryu et al. |
| 2013/0124079 A1 | 5/2013 | Olivier et al. |
| 2014/0330544 A1 | 11/2014 | Nikolaev et al. |
| 2016/0264268 A1 | 9/2016 | Aylmer |
| 2016/0305773 A1* | 10/2016 | Farah ................. G01B 9/02098 |
| 2018/0346153 A1 | 12/2018 | Kaplan |
| 2020/0262589 A1 | 8/2020 | Turner |
| 2021/0261276 A1 | 8/2021 | Tack et al. |
| 2021/0314058 A1 | 10/2021 | Lucia et al. |
| 2022/0024611 A1 | 1/2022 | Hendrix et al. |
| 2022/0124262 A1 | 4/2022 | Gallucci et al. |
| 2022/0369308 A1 | 11/2022 | Hendrix et al. |

FOREIGN PATENT DOCUMENTS

| | | |
|---|---|---|
| WO | 2013169309 A3 | 11/2013 |
| WO | 2021060490 A1 | 4/2021 |
| WO | 2021065734 A1 | 4/2021 |
| WO | 2021107051 A1 | 6/2021 |
| WO | 2021182425 A1 | 9/2021 |
| WO | 2021230167 A1 | 11/2021 |
| WO | 2021230168 A1 | 11/2021 |
| WO | 2021230169 A1 | 11/2021 |
| WO | 2021230171 A1 | 11/2021 |
| WO | 2021239732 A1 | 12/2021 |
| WO | 2022192735 A1 | 9/2022 |

OTHER PUBLICATIONS

Dunham, et al., The Mars Society, "Morph the Gateway into an Earth-Mars Cycler" Trajectories to/from Mars, 23 pages (2020).

Maskell, Bob; SpaceNews, "Confessions of a MILSTAR Mafioso," 5 pages (2023).

O'Connell et al., "The NorthStar System: A New Era in Earth Observation," IEEE International Geoscience and Remote Sensing Symposium, 18 pages (2017).

* cited by examiner

α=90°
β=0°
γ=90°

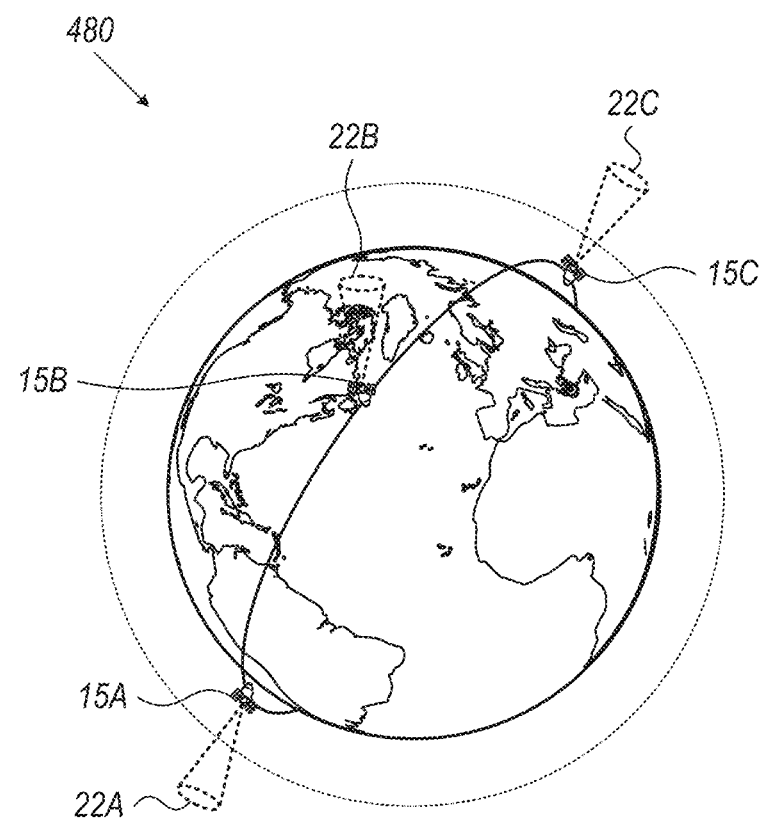
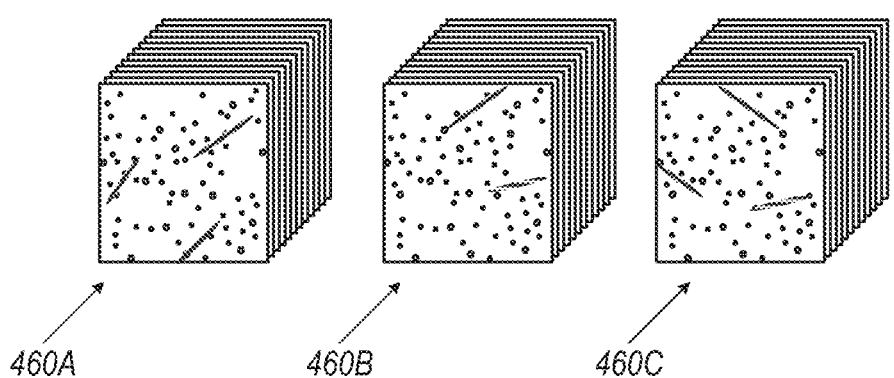
FIG. 8

510 Instructing a plurality of satellites in orbit around a celestial body in at least one orbital plane to store celestial feature metadata of each image from a plurality of images, where each satellite from the plurality of satellites includes at least one satellite processor; a non-transitory satellite computer memory, a satellite communication circuitry, at least one imaging device, where the at least one imaging device includes at least one imaging optical arrangement and a plurality of sensors, where the at least one imaging optical arrangement is configured to have a field of view (FOV) to capture an image of a sky, where the image of the sky captured by the at least one imaging device within the FOV includes at least one celestial image feature that is representative of at least one of: at least one other celestial body or at least one other celestial body and at least one resident space object (RSO), where the plurality of sensors is configured to define a plurality of pixels to detect light through the at least one imaging optical arrangement and to generate image data of the image within the FOV, where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter

520 Instructing the at least one satellite processor to iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane

530 Instructing the at least one satellite processor to store the celestial feature metadata in the non-transitory satellite computer memory for each image from the plurality of images, where the celestial feature metadata includes: the image data, a camera shutter open duration data, satellite system data, a sensor integration time data, and an acquisition timestamp data

540 Instructing at least one centralized computer processor to receive the celestial feature metadata of each image from the plurality of images from the plurality of satellites in orbit around the celestial body in the at least one orbital plane

550 Instructing the at least one centralized computer processor to generate at least 1,000 celestial image features based on the celestial feature metadata from the plurality of images detected in a portion of the sky

SYSTEM AND METHOD FOR GENERATING A PLURALITY OF CELESTIAL IMAGE FEATURES FROM A PLURALITY OF IMAGES OF A SKY

FIELD OF THE DISCLOSURE

The field of the disclosure relates to astronomical imaging. More particularly, the field of the disclosure relates to system and method for generating a plurality of celestial image features from a plurality of images of a sky.

BACKGROUND OF THE DISCLOSURE

Satellites in orbit about the Earth may enable technologies such as inter-continental communication, precision navigation, weather forecasting, Earth imaging, and astronomical observations to name a few. However, with the number of these orbiting satellites rapidly approaching 10,000 satellites, these satellites may create space debris when decommissioned subjecting the other satellites in orbit to possible space debris collisions. Currently, there may be over 35,000 space debris objects greater than 10 cm and over 1,000,000 space debris objects between 1 cm and 10 cm.

BRIEF DESCRIPTION OF THE FIGURES

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

FIG. 8 is schematic diagram of three imaging devices on three satellites respectively generating a plurality of images in accordance with one or more embodiments of the present disclosure;

FIG. 9 is a flowchart of a computer-based method for generating a plurality of celestial image features from a plurality of images of a sky in accordance with one or more embodiments of the present disclosure.

SUMMARY

Figure 1A:
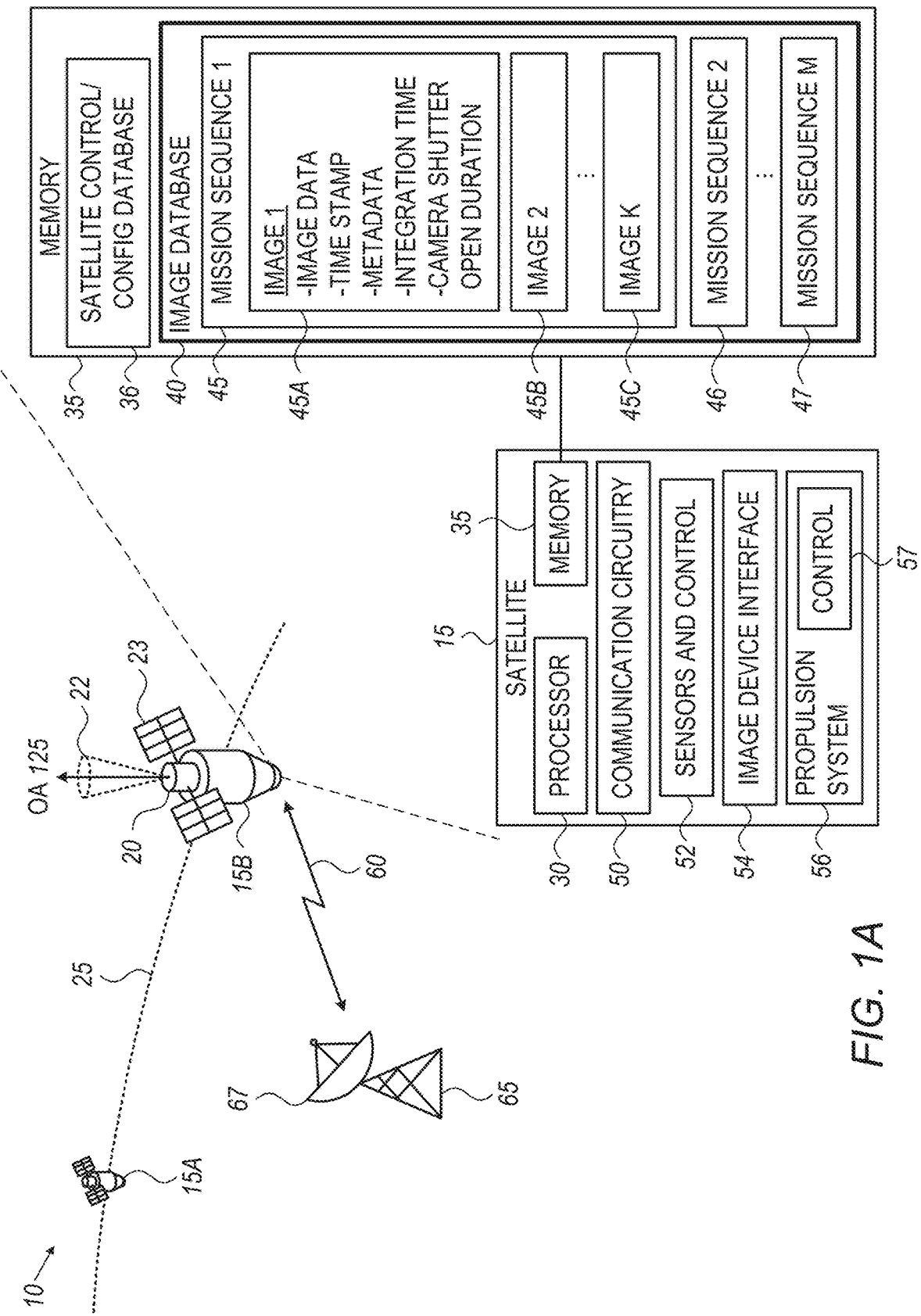
FIGS. 1A-1B are schematic diagrams of a system in accordance with one or more embodiments of the present disclosure.

In some embodiments, the present disclosure provides an exemplary technically improved computer-based system that includes a plurality of satellites in orbit around a celestial body in at least one orbital plane. Each satellite from the plurality of satellites may include: at least one satellite processor; a non-transitory satellite computer memory; a satellite communication circuitry; at least one imaging device including: at least one imaging optical arrangement and a plurality of sensors; where the at least one imaging optical arrangement may be configured to have a field of view (FOV) to capture an image of a sky; where the image of the sky captured by the at least one imaging device within the FOV may include: at least one celestial image feature that is representative of at least one of: at least one other celestial body or at least one other celestial body and at least one resident space object (RSO); where the plurality of sensors may be configured to define a plurality of pixels to detect light through the at least one imaging optical arrangement and to generate image data of the image within the FOV; where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter; where the at least one satellite processor may be configured to: iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane; store celestial feature metadata in the non-transitory satellite computer memory for each image from the plurality of images; where the celestial feature metadata may include: the image data, a camera shutter open duration data, satellite system data, a sensor integration time data, and an acquisition timestamp data; and a central computing processing arrangement including at least one centralized computing processor of at least one centralized computer; where the at least one centralized computing processor may be configured to: receive the celestial feature metadata of each image from the plurality of images from the plurality of satellites in orbit around the celestial body in the at least one orbital plane; and generate at least 1,000 celestial image features based on the celestial feature metadata from the plurality of images detected in a portion of the sky.

In some embodiments, the present disclosure provides an exemplary technically improved computer-based method that includes at least the following steps of instructing a plurality of satellites in orbit around a celestial body in at least one orbital plane to store celestial feature metadata of each image from a plurality of images; where each satellite from the plurality of satellites may include: at least one satellite processor; a non-transitory satellite computer memory; a satellite communication circuitry; at least one imaging device including: at least one imaging optical arrangement and a plurality of sensors; where the at least one imaging optical arrangement may be configured to have a field of view (FOV) to capture an image of a sky; where the image of the sky captured by the at least one imaging device within the FOV may include: at least one celestial image feature that is representative of at least one of: at least one other celestial body or at least one other celestial body and at least one resident space object (RSO); where the plurality of sensors may be configured to define a plurality of pixels to detect light through the at least one imaging optical arrangement and to generate image data of the image within the FOV; where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter; instructing the at least one satellite processor to iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane; instructing the at least one satellite processor to store the celestial feature metadata in the non-transitory satellite computer memory for each image from the plurality of images; where the celestial feature metadata may include: the image data, a camera shutter open duration data, satellite system data, a sensor integration time data, and an acquisition timestamp data; instructing at least one centralized computer processor of at least one centralized computer of a central computing processing arrangement to receive the celestial feature metadata of each image from the plurality of images from the plurality of satellites in orbit around the celestial body in the at least one orbital plane; and instructing the at least one centralized computer processor to generate at least 1,000 celestial image features based on the celestial feature metadata from the plurality of images detected in a portion of the sky.

DETAILED DESCRIPTION

As more and more satellites are deployed into orbit about the Earth, there is a higher probability of collisions between space debris and important satellites. Velocities of space debris in orbit about a celestial body such as the Earth may be so high that even the smallest pieces of space debris may collide with important satellites like a bullet. Thus, as the number of a plurality of resident space objects (RSO) in orbit about the Earth grows, there is a need in the art to detect, identify and map the plurality of RSOs in space for RSO identification, RSO orbital determination, predictive RSO conjunction analysis, and RSO collision assessment.

A resident space object (RSO) may be a natural or artificial object that orbits another body. RSOs may be active and/or inactive and/or natural and/or man-made. For example, RSOs may broadly include, but are not limited to asteroids, comets, meteoroids, (active and/or inactive) satellites, rockets, and/or other space debris such as for example but not limited to rocket upper stages, debris from collisions and/or explosions, fragments of paint and/or other materials, and/or micrometeoroids. Collisions between RSOs may generate even more debris, which may further increase a risk of collisions.

Space situational awareness (SSA) may refer to the practice of tracking and/or monitoring RSOs to identify potential hazards and to support safe space operations particularly for government and/or commercial space activities. The number of RSOs in orbit has been increasing in recent years, due to the growing number of space launches, which has made SSA increasingly important. RSOs may be tracked using a variety of ground-based and/or space-based sensors. The data from these sensors may be used to create catalogs of RSOs, which may be used by SSA organizations to identify potential hazards and/or to support safe space operations so as to mitigate the risks posed by RSOs. This risk mitigation may include but are not limited to developing new technologies to track and/or remove RSOs from orbit, as well as developing international standards and regulations for space operations.

Embodiments of the present disclosure herein provide a system and method for generating a plurality of celestial image features from a plurality of images of a sky from which a mapping of the plurality of resident space objects (RSO) in orbit around a celestial body such as the Earth may be based. A constellation of low-cost space based optical sensor payloads (e.g., imaging cameras), and/or other sensor payloads, deployed on a plurality of satellites in a respective plurality of orbital planes around the Earth may be used to capture images of celestial bodies in outer space about the Earth.

In some embodiments, a coverage of a portion of the entire sky around the Earth may be imaged using a number of imaging cameras mounted on respective satellites respectively in orbit along a plurality of predefined orbital planes around the Earth such as but not limited to circular orbital planes. As each satellite moves along its orbit, its imaging camera may acquire images of outer space at predefined acquisition time intervals. The acquired images may include celestial feature images of a plurality of resident space objects (RSO) and/or a plurality of other celestial bodies such as planets and/or stars. The number of satellites travelling along the plurality of orbital planes and/or the number and orientation of the orbital planes may determine the amount of coverage of the portion of the entire sky around the Earth that the image data from the optical payload on each of the plurality of satellites may capture as will be disclosed in the following Figures.

It should be noted that the embodiments disclosed herein may generally be used for imaging RSOs in orbit around any celestial body, or celestial reference body. The term "other celestial bodies" may refer to planets and/or stars with reference to the celestial body such as the Earth, for example.

It should be noted that the embodiments disclosed herein are directed to capturing image data of a plurality of images that are acquired by the constellation of a plurality of low-cost space based optical sensors (e.g., imaging devices), and/or other sensor payloads, on a respective plurality of satellites in multiple orbital planes about the Earth. The images may include any of a plurality of RSOs in orbit around the Earth that may move within the field of view of the imaging device. Any of the plurality of other celestial bodies such as planets and/or stars that may also be captured in the field of view. Hence the imaging device may generate images of moving RSOs and/or other moving celestial bodies (e.g., stars and/or planets) as celestial image feature streaks within the frame. The length of the streaks may be indicative of the orbital velocity of the RSOs and/or other moving celestial bodies. Thus, the plurality of images captured during an acquisition time interval (e.g., hourly, daily, weekly, monthly, or by any other interval) may cover all orbital regimes of the plurality of RSOs.

Stated differently, a streak may include one RSO trace in an image frame and it may lead to an observation when measured. A track may be a combination of streaks of the same RSO from multiple image frames, which may be used to extract an RSO orbit when the tracks are processed.

In some embodiments, the plurality of images may be sequentially captured in predefined acquisition time intervals as a continually imaging framing system such that each next image may include new features as well as substantially the same features as the previous image. The predefined acquisition time interval may be chosen so as to define the frame-to-frame image feature coverage. As a non-limiting example, a frame-to-frame feature coverage of 90% may include 90% of the same celestial image features in an initial and next image frame and 10% new celestial image features. In this manner, a celestial image feature mapping may be generated for the plurality of images of the plurality of RSOs and/or other celestial bodies.

In some embodiments, for each detected space-based image, an observation may be generated. At a given time instant and a given location in space, big data analytics, machine learning models and/or advanced algorithms may be applied to the acquired celestial image features from the image data to determine which particular RSO may be at a particular location in space at a particular time for RSO identification (known and/or unknown RSO), RSO orbital determination, predictive RSO conjunction analysis, and RSO collision assessment. The celestial image feature mapping may be used to continuously update this data and predict the presence of unknown and/or new RSOs in space.

In some embodiments, the image data from the plurality of images acquired by a particular imaging device on a particular satellite may be transmitted periodically to a centralized computer for processing. The centralized computer may be a ground-based centralized computer (e.g., base station) and/or one or more distributed satellite computers and/or a particular satellite computer designated as the centralized processing computer. Thus, the plurality of images acquired by the plurality of satellites in orbit around the Earth may be used by the centralized computer in the generation of the celestial image features (which may also be in the form of a map and/or catalog) as well as the subsequent processing of the image celestial image feature mapping using the big data analytics, machine learning models and/or advanced algorithms.

Figure 1B:
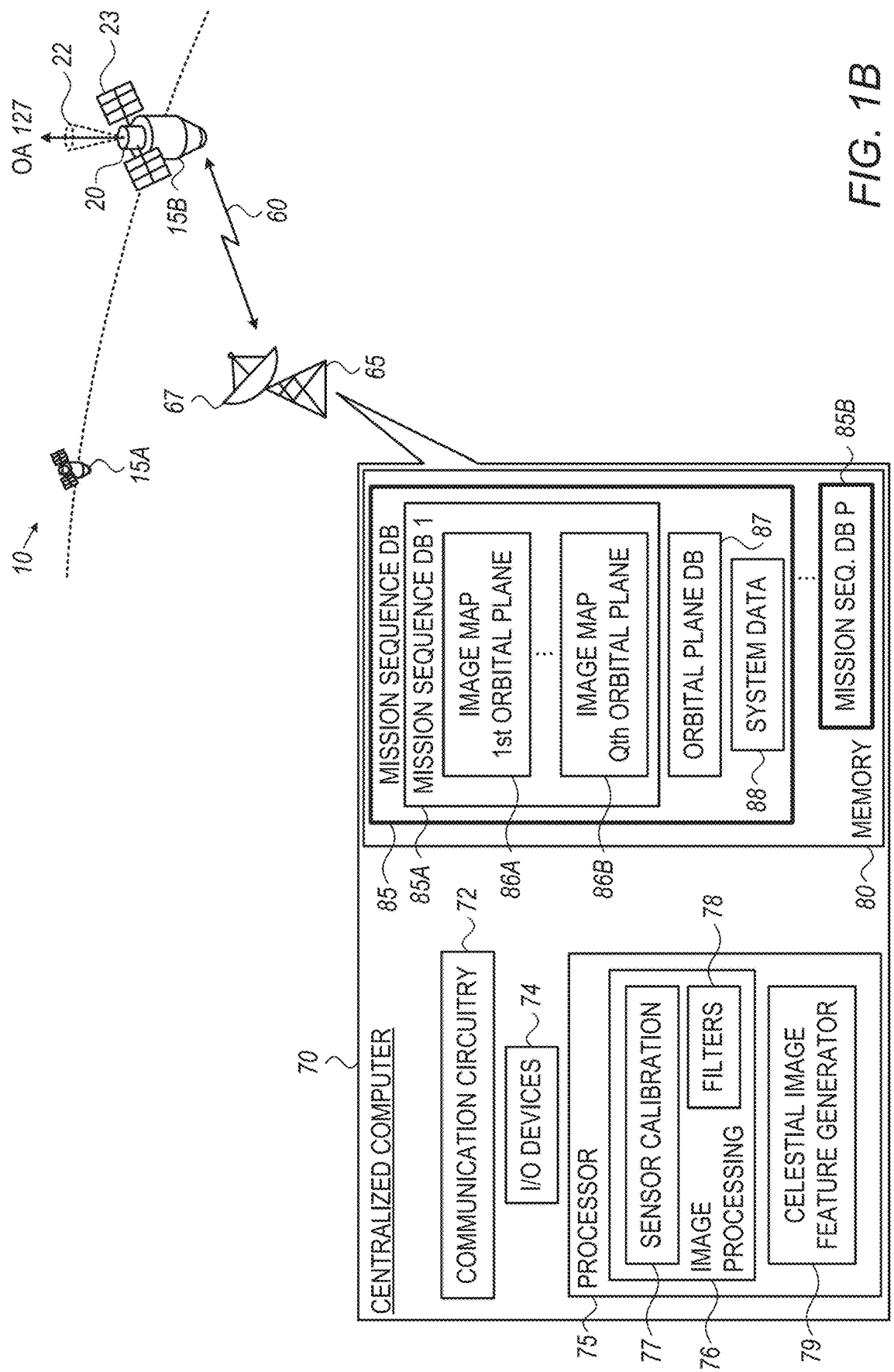

FIGS. 1A-1B are schematic diagrams of a system 10 for generating a plurality of celestial image features from a plurality of images of a sky in accordance with one or more embodiments of the present disclosure. The system 10 may include a plurality of satellites 15 denoted as 15A and 15B travelling on an orbital plane 25. Each satellite 15 may include at least one imaging camera 20 with a field of view (FOV) 22 with an optical axis (OA) 125 oriented in the middle of the FOV 22 pointing into the sky (e.g., outer space).

In some embodiments, the FOV 22 may be conical shaped.

In some embodiments, the satellites 15A and 15B may have solar panels 23 to power the satellite.

In some embodiments, each satellite 15 may include a computing system that may further include at least one satellite processor 30, at least one non-transitory computer memory 35, at least one communication circuitry 50, at least one sensor and control module 52 that may include at least one sensors and control circuitry for controlling at least one imaging optical arrangement, at least one imaging device data interface 54 (e.g., application programming interface (API) routines) for receiving image data from the plurality of sensors, and at least one propulsion system 56 including thrusters, for example, for moving the satellite through space, and at least one controller 57 that is configured to control the at least one propulsion system 56.

In some embodiments, different satellite configurational data may be stored within at least one satellite control and configuration database 36. The at least one satellite processor 30 may be specifically configured to fetch the satellite configurational data when needed.

In some embodiments, the satellite configurational data for imaging outer space may include but is not limited to (1) orbital data of the satellite for determining its altitude, inclination, local time of ascending node, orbital state vector and/or eccentricity. This information may be used for planning observations and for predicting the satellite's position over time. (2) The attitude data of the satellite for determining its orientation in space. This information may be used for pointing the satellite's instruments at specific targets. (3) The instrument configuration data that may include information about the different instrument modes of operation, filters, and other settings. This information may be used for processing the data collected by the instrument. (4) Calibration data may be used to correct for any errors in the instrument's measurements. This information may be used for obtaining accurate and reliable data.

In some embodiments, there may be other satellite configuration data that may be relevant to imaging outer space. For example, some satellites may carry additional instruments that can be used to support imaging operations, such as for example star trackers and/or gyroscopes.

In some embodiments, an orbital plane of an object such as the satellite 15 may be the plane in which it orbits around another object. The orbital plane may be defined by three parameters: (1) Inclination: The angle between the orbital plane and a reference plane. The reference plane may typically be, for example, the ecliptic plane for objects orbiting the Sun, or the equatorial plane of the central body for objects orbiting a planet or moon. (2) Longitude of the ascending node: The angle between the reference plane and the line where the orbital plane may cross the reference plane from south to north. LTAN may be a parameter used in orbital mechanics that describes the time of day at which a satellite in a sun-synchronous orbit (SSO) may cross the equator from south to north. SSOs may be designed to keep the satellite at the same local solar time as it passes over any given point on Earth so as to allow for consistent lighting conditions such as for imaging. Examples of LTAN for SSO satellites may be (but not limited to) 10:30 and 13:30 (1:30 PM) because of good lighting conditions and minimization of atmospheric drag. (3) Argument of periapsis: The angle between the line of nodes (the line connecting the ascending and descending nodes) and the major axis of the ellipse.

These parameters may be used to describe the orbital plane of any object.

The orbital plane of an object may be visualized as a large, flat disk. The object itself may orbit around the central body (e.g., the Earth) within this plane. The inclination of the orbital plane may determine how much the plane may be tilted relative to the reference plane. The longitude of the ascending node may determine where the orbital plane may cross the reference plane from south to north. The argument of periapsis may determine where the object may be closest to the central body within its orbit. Orbital planes may be used to predict the motion of objects in space. For example, knowing the orbital planes of two objects may be used to predict when the two objects may collide or when one object may occult the other object.

Orbital plane eccentricity may be a measure of how much an orbit deviates from a perfect circle. A circular orbit may have an eccentricity of 0, while a more elliptical orbit may have an eccentricity closer to 1. True anomaly may be the angle between the periapsis of an orbit and the current position of the orbiting body. The periapsis may be the point in the orbit where the orbiting body is closest to the central body.

In some embodiments, during a data collection session, which may be also referred to herein as a mission sequence, or a data collection sequence, image data may be outputted from the at least one imaging device 20 and stored in at least one image database 40 in a plurality of M mission sequence sub-databases where M is an integer.

In some embodiments, the at least one image database 40 may store the image data of k images where k is an integer acquired at predefined time acquisition intervals as the at least one satellite 15 and the at least one imaging camera 20 move along at least one predefined orbital plane 25. The image data records of the k images may be denoted image data record 1 45A, image data record 2 45B, . . . and image data record K 45C.

In some embodiments, each image data record 45A, 45B, and 45C for each acquired image may include celestial feature metadata such as but not limited to image data, an acquisition time stamp data of the image data acquisition, satellite system data, a sensor integration time data of the plurality of sensors, and/or a camera shutter open duration data.

In some embodiments, the image data may be in an image data format that may include, but not limited to, raw data image, a flexible transport image system (FITS) format, a tagged image file format (TIFF), a joint photographic experts group (JPEG) format, a portable network graphics (PNG) format, a hierarchical data format version 5 (HDF5) and/or raw data formats. The raw data formats may include proprietary and/or specialized formats.

In some embodiments, the image data may be in a video data format that may include but not limited to raw video data, MPEG-4 video compression format, H.264 (also known as AVC) highly efficient video compression format, H.265 (HEVC—high efficiency video coding) format, audio video interleave (AVI) format, Quicktime (MOV) format, other proprietary formats with specialized compression and/or data storage methods, and/or raw video data formats in an uncompressed and/or lightly processed format.

In some embodiments, the satellites 15A and 15B may communicate 60 with a centralized computer 70 as shown in FIG. 1B so as to transmit the image data from a mission sequence to the centralized computer 70. The centralized computer 70 may include at least one centralized computing processor 75, input and/or output (I/O) devices 74, at least one centralized computing communication circuitry, and at least one centralized computing non-transitory memory 80.

In some embodiments, the at least one centralized computing non-transitory memory 80 may be configured to store a mission sequence database (DB) 85 that may include data from a plurality of P missions with the image data that is received from each of the plurality of satellites, where P is an integer. The P mission sequence databases may be denoted MISSION SEQUENCE DB 1 85A . . . . MISSION SEQUENCE DB P 85B. Each of the P mission sequence databases may include a plurality of image map records with each image map record that includes image data of images taken by satellites along the same orbital plane that capture images of substantially the same portion of outer space.

For example, in the exemplary embodiment shown in FIG. 1B, MISSION SEQUENCE 1 DB 85A may include an orbital plane database (DB) 87 with orbital plane data, system data 88, and image maps from a plurality of Q orbital planes where Q is an integer denoted as IMAGE MAP $1^{st}$ ORBITAL PLANE 86A . . . IMAGE MAP $Q^{th}$ ORBITAL PLANE 86B.

In some embodiments, the at least one mission sequence database (DB) 85 stored in the at least one centralized computing non-transitory memory 80 may be arranged in any suitable manner and not limited to the exemplary embodiment shown in FIG. 1B. For example, the mission sequence database (DB) 85 may be partitioned to separate databases that store image data from each satellite in orbit around the Earth independent of mission.

In some embodiments, the centralized computer 70 may be a ground-based base station 65 with a base station computer (Earth-based computer) 70 for processing the image data acquired by a downlink via a base station antenna 67.

In some embodiments, the centralized computer 70 may include at least one particular satellite processor designated from a plurality of satellite processors 30 where the data is not transmitted to Earth but processed in space. Each of the plurality of satellite processors 30 may transmit the image data to the at least one designated satellite processor designated as the centralized computer 70 for processing.

In some embodiments, satellite ground station 65 or ground-based base station may be a facility on Earth that may communicate with the satellites 15 in space. The ground stations may be used to send and receive data (uplink and downlink, respectively), including voice, video, and telemetry data. Ground stations may be also used to track and control satellites. Ground stations may include a variety of equipment such as for example, but not limited to an antenna that may be used to transmit and receive radio signals from satellites. The antenna may be in a variety of sizes and shapes, and types, all of which may depend on the frequency of the signals that they may be designed to handle. Receivers and/or transmitter and/or accompanying circuitry that may be used to convert radio signals and data therein into electrical signals for signal processing. Signal processing equipment may be used for amplifying, filtering, and/or modulating/demodulating the transmitted and/or received radio signals.

In some embodiments, the ground stations 65 in the context herein may be used for spacecraft tracking and control for tracking the location and orientation of satellites as described herein to send them commands and/or receive data. The spacecraft tracking and control may be used for maintaining the satellites in orbit and for ensuring that they are operating properly. Ground stations may be located all over the world. Some ground stations may be owned and/or operated by government agencies, military and/or private companies.

In some embodiments, the transmission of data between any of the plurality of satellites 15 and the centralized computer 70 in a ground station may be via an uplink and a downlink. The uplink may be the transmission of data from the ground station to the satellite. The downlink may be the transmission of data from the satellite to the ground station.

In some embodiments, the antenna 67 may be a parabolic antenna. The parabolic antenna may focus radio waves into a narrow beam, which allows for long-distance communication between the ground station 65 and any of the plurality of satellites 15.

In some embodiments, communications satellites may use the uplink and/or downlink to transmit voice, data, and video signals. Observation satellites such as disclosed herein may use the downlink to transmit images and other data from the space-based images. Navigation satellites may use the downlink to transmit positioning and timing information to users on the ground.

In some embodiments, the at least one centralized computing processor 75 may execute a number of software modules: an image processing module 76 that may be configured to apply big data analytics, machine learning models and/or advanced algorithms to the acquired image data. The filtering 78 module may apply matched filters to the raw image data streaks collected by the imaging devices 20 on each of the satellites 15. The parameters of the match filter may be tuned with data based on observed RSOs having position information such as GPS data, for example. In other embodiments, the GPS data may be used to train the machine learning and/or AI models for processing of the plurality of celestial image features.

In some embodiments, the software modules shown in the centralized computer 70 of FIG. 1B may be executed by a central computing processing arrangement that may include a plurality of computing processors of a plurality of computers (e.g., different computing machines) that may be distributed across different physical locations or all located at one location.

In some embodiments, the software modules shown in the centralized computer 70 of FIG. 1B may be executed by a central computing processing arrangement that may include at least one centralized computing processor of at least one centralized computer.

It should be noted that the term "central computing processing arrangement" may refer to any suitable arrangement of processing devices, computers, computing machines, etc., that may be at a single location or distributed over multiple physical locations so as to perform the functions described herein.

In some embodiments, central computing processing arrangement may use load balancing techniques to optimize the computational efficiency between different computers, computing devices and/or computing machines in processing the image data and/or celestial feature metadata associated with each of the plurality of images.

In some embodiments, a celestial image feature generator module 79 may use the images acquired from the different satellites to generate a plurality of celestial image features such as streaks and/or star patterns captured in these images.

In some embodiments, the celestial image feature generator module 79 may be configured to extract the celestial image features by 1) correlating partial signals (based on a preset defocusing parameter) and specific general orbit, but without known a priori RSO knowledge, and 2) changing detection by overlapping two (or more) subsequent frames based on the overlap and identifying obvious changes.

In some embodiments, the celestial image feature generator 79 may identify at least 1000 celestial image features in the plurality of images. In some embodiments, the celestial image feature generator 79 may identify at least 10,000 celestial image features in the plurality of images. In some embodiments, the celestial image feature generator 79 may identify at least 100,000 celestial image features in the plurality of images. In some embodiments, the celestial image feature generator 79 may identify at least 1,000,000 celestial image features in the plurality of images. In some embodiments, the celestial image feature generator 79 may identify at least 10,000,000 celestial image features in the plurality of images.

In some embodiments, the celestial image feature generator module 79 may use all of the images acquired from the different satellites to generate a celestial image feature image mapping based on a desired format and/or schema for arranging all of the space-based images for an easy and seamless integration with RSO calibration and/or detection algorithms.

In some embodiments, RSOs identified in the image map may be compared with data stored in a resident space object (RSO) repository database that may include information about known RSOs. The RSO repositories may be used by a variety of organizations, including space agencies, military agencies, satellite operators, and researchers. Space agencies may use RSO repositories to track the movement of RSOs and to assess the risk of collisions. Satellite operators may use RSO repositories to avoid collisions with other satellites. Researchers may use RSO repositories to study the population of RSOs and to develop ways to mitigate the risks posed by RSOs.

In some embodiments, any or all of the RSO repository databases may be updated with the generated celestial image features based on celestial feature metadata of each image from the plurality of images and/or processed celestial image features data.

In some embodiments, the updating of data in RSO database repositories acquired using the embodiments disclosed herein may be crucial for managing the risks posed by RSOs. By tracking the movement of RSOs and assessing the risk of collisions, RSO repositories may help to ensure the safety of satellites and astronauts. RSO repositories may improve the safety of satellites and astronauts by tracking the movement of RSOs and assessing the risk of collisions. RSO repositories may help to reduce the costs associated with space operations by helping satellite operators to avoid collisions with other satellites. RSO repositories may help researchers to better understand the population of RSOs and to develop ways to mitigate the risks posed by RSOs.

In some embodiments, a satellite orbit may be the path that a satellite may take around a planet or other celestial object. Satellite orbits may be determined by the gravitational pull of the planet or other celestial object, as well as the speed and direction at which the satellite may be launched. There are many different types of satellite orbits, but the most common may include:

Low Earth orbit (LEO): LEO satellites may orbit the Earth at an altitude of between 160 and 2,000 kilometers. LEO satellites may often be used for communications, navigation, and remote sensing.

Medium Earth orbit (MEO): MEO satellites may orbit the Earth at an altitude of between 2,000 and 35,786 kilometers.

MEO satellites may often be used for global positioning systems (GPS) and communications.

Geosynchronous Earth orbit (GEO): GEO satellites may orbit the Earth at an altitude of 35,786 kilometers, which is the same altitude as the Earth's rotation. Accordingly, GEO satellites may stay over the same spot on the Earth's surface. GEO satellites may be often used for weather forecasting, communications, and television broadcasting.

A cislunar orbit may refer to an orbit in the region between the Earth and the orbit of the moon.

Satellite orbits may also be classified by their inclination, which is the angle between the satellite's orbital plane and the Earth's equatorial plane. Satellites with an inclination of 0 degrees orbit may be in the same plane as the Earth's equator, while satellites with an inclination of 90 degrees may orbit directly over the Earth's poles.

Satellite orbits may also be classified by their eccentricity, which may be a measure of how elliptical an orbit is. A perfectly circular orbit may have an eccentricity of 0, while a highly elliptical orbit may have an eccentricity of close to 1. Generally, orbits for which eccentricity is greater than 0.1 may be categorized as highly elliptical.

Note that the above description of satellites in orbit (e.g., the sensor-based satellites) may also be applied to RSOs in orbit around the Earth or a celestial body.

FIGS. 2A-2D are schematic diagrams of the satellite 15 orbiting a celestial body 110 with different orientations for imaging outer space in accordance with one or more embodiments of the present disclosure.

Figure 2A:
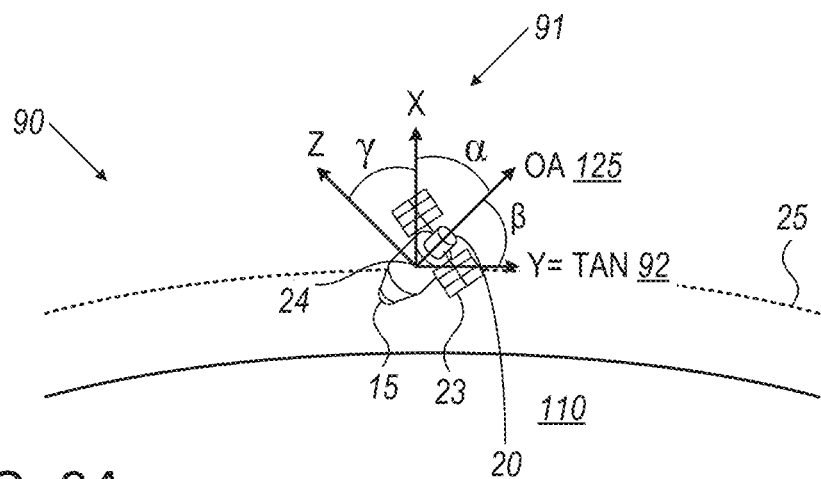
FIGS. 2A-2D are schematic diagrams of a satellite orbiting a celestial body with different orientations for imaging outer space in accordance with one or more embodiments of the present disclosure.

In some embodiments, as the schematic diagram 90 shown in FIG. 2A, the satellite 15 may be orbiting around the celestial body 110 such as the Earth in an orbital plane 25. A Cartesian coordinate system 91 with orthogonal XYZ axes with an origin 24 on a body of the satellite 15 is shown in FIG. 2A. The origin 24 may be placed in any suitable position on the body of the satellite 15. The satellite 15 may move along the orbital plane 25 travelling with any orbital velocity where the component of a tangential orbital velocity vector (TAN) 92 (tangential to the orbital plane 25) may be coincident with the Y axis, for example. In this coordinate scheme, the vector coincident with the optical axis 125 of the imaging device 20 may form an angle α with the X-axis, an angle β with the Y-axis, and an angle γ with the Z-axis. Stated differently, the optical axis 125 of the imaging camera 20 may be configured to image a portion of the sky pointing at any arbitrary angle (e.g., a predefined pointing angle) relative to the origin 24 on the body of the satellite 15 along the orbital plane 25.

Note that the terms imaging device, imaging camera, and camera may be used interchangeably herein.

Figure 2B:
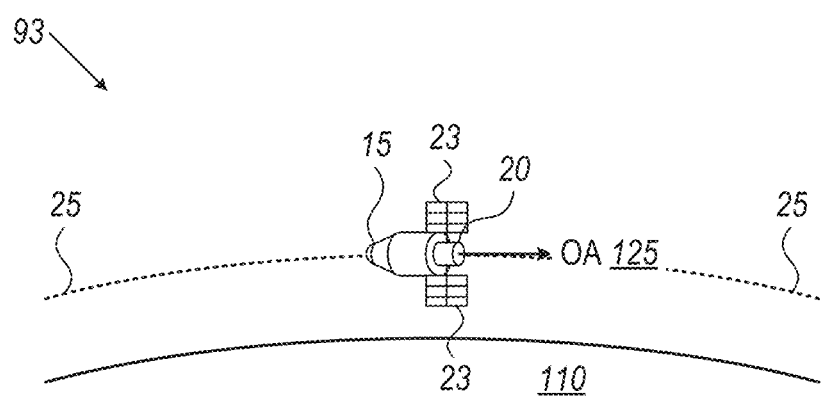

In some embodiments, as the schematic diagram 92 shown in FIG. 2B, the satellite 15 may be orbiting around the celestial body 110 where the imaging camera 20 may be aft or forward imaging so as to image the portion of the sky substantially in the direction of tangential orbital velocity vector (TAN) 92 such that α=90°, β=0°, and γ=90°.

Figure 2C:
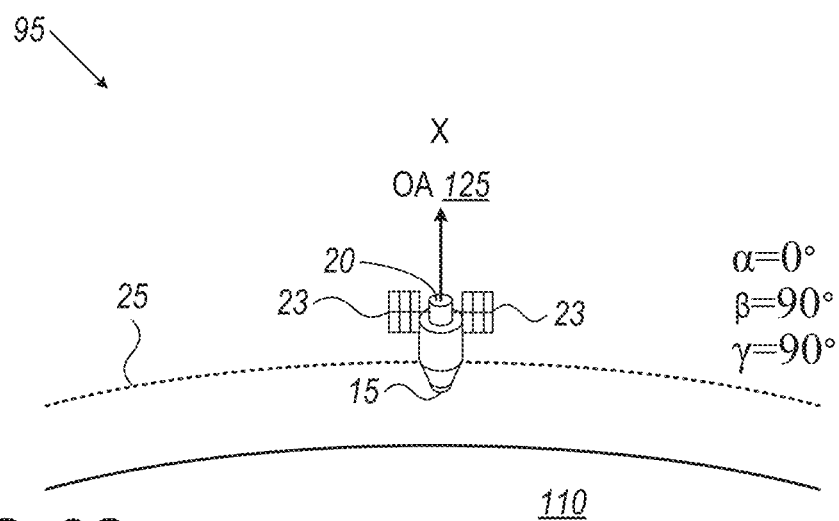

In some embodiments, as the schematic diagram 95 shown in FIG. 2C, the satellite 15 may be orbiting around the celestial body 110 where the imaging camera 20 may be side pointing so as to image the portion of the sky substantially perpendicular to the direction of tangential orbital velocity vector (TAN) 92 and opposite to the celestial body such that α=0°, β=90°, and γ=90°.

Figure 2D:
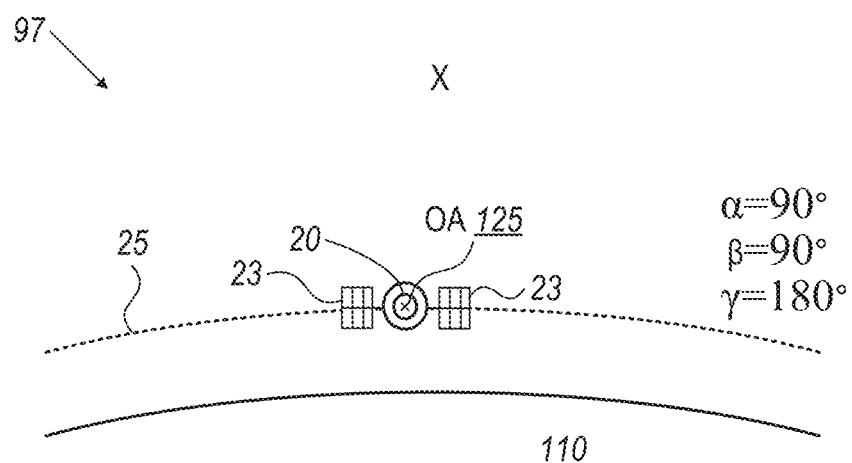

In some embodiments, as the schematic diagram 97 shown in FIG. 2D, the satellite 15 may be orbiting around the celestial body 110 where the imaging camera 20 may be boresight so as to image the portion of the sky substantially in the direction perpendicular to the orbital plane 25 (e.g., α=90°, β=90°, and γ=180°). In the case shown in FIG. 2D, the optical axis 125 is pointing the Z-direction outward from the plane of the page. In other embodiments, the optical axis 125 may be pointing in the Z-direction into the plane of the page α=90°, β=90°, and γ=0°

Note that the embodiments shown in FIGS. 2A-2D with the exemplary coordinate system 91 are merely for visual and conceptual clarity and not by way of limitation of the embodiments disclosed herein. The coordinate system 91 is merely used to illustrate that the optical axis 125 may image the portion of the sky in any arbitrary predefined pointing angle (direction) relative to the direction of the orbital velocity of the satellite 15 and the origin 24 on the body of the satellite 15. Any suitable coordinate system may be used.

For sake of clarity, the orientation of the satellite 15 is shown in the FIGS. 1A-1B, 2D-2E, and 3-8 herein in the boresight orientation of FIG. 2C but it is to be understood that in each of these figures, the optical axis 125 may be in any predefined orientation with respect to the motion of the satellite.

Figure 2E:
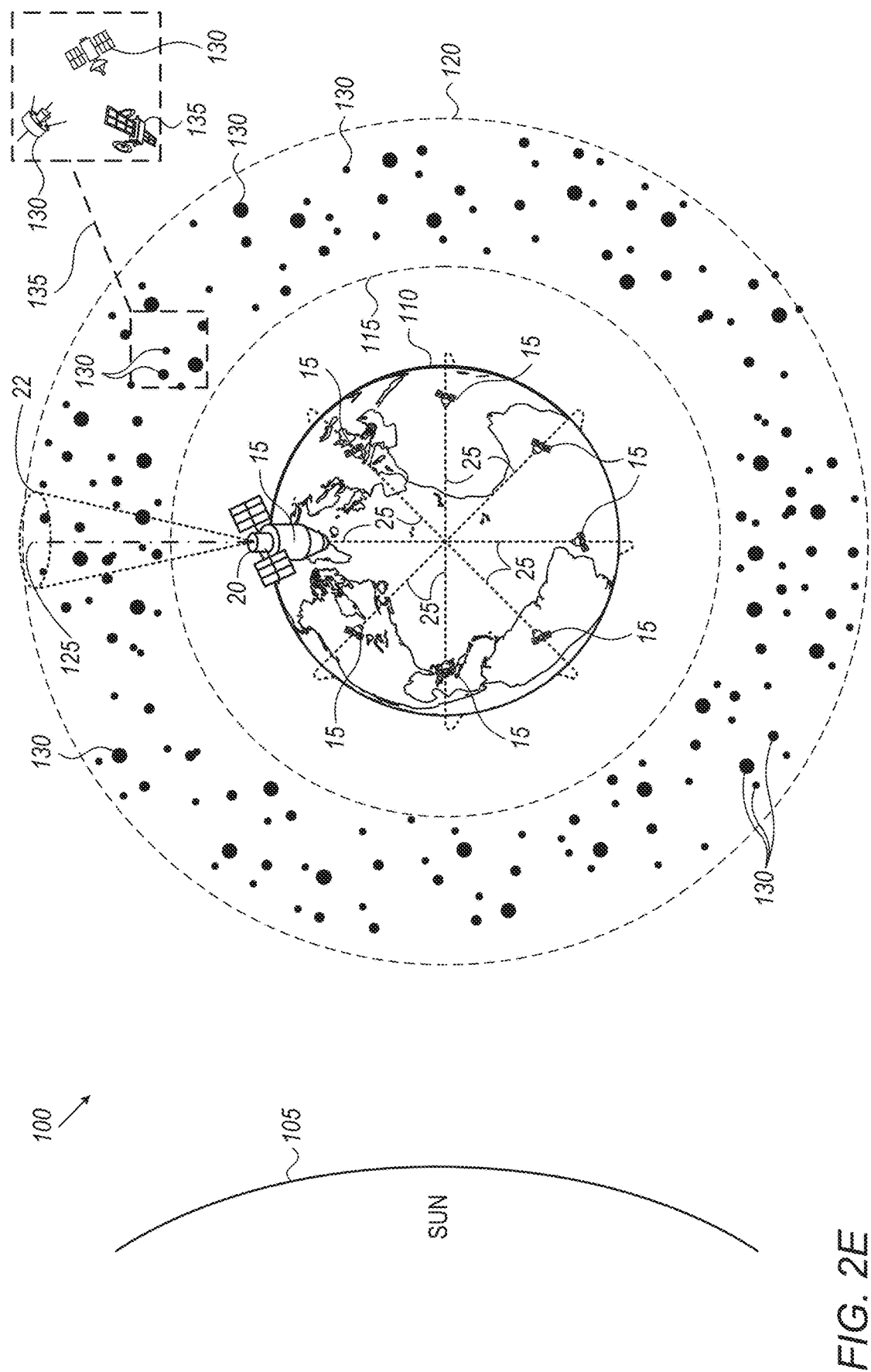
FIG. 2E is a schematic diagram of a plurality of satellites and a plurality of resident space objects (RSO) in an orbit about a celestial body in accordance with one or more embodiments of the present disclosure.

FIG. 2E is a schematic diagram 100 of a plurality of satellites 15 and a plurality of resident space objects (RSO) 130 in an orbit about a celestial body 110 in accordance with one or more embodiments of the present disclosure. The celestial body 110 may be the Earth for example, which may be illuminated by a sun 105. The plurality of satellites 15 may be configured, but not limited to orbit the celestial body 110 in four orbital planes 25, for the exemplary embodiment of FIG. 2E, that may be respectively oriented 45 degrees from one another in FIG. 2E.

Furthermore, the plurality of RSOs 130 may orbit the Earth from a start 115 of a low Earth orbit (LEO) region at about 160 km above the Earth to an end 120 of geosynchronous (GEOS) orbit region or 35,786 km above the Earth. Note that the plurality of RSO 130 may be located within two concentric spheres of RSOs 130 bounded by the start of the LEO region 115 and the GEOs distance 120 as shown in FIG. 2E. The plurality of RSO 130 although shown as black dots may be, for example, satellites 130 as shown in an enlarged inset 135.

The embodiment shown in FIG. 2E is merely for visual and conceptual clarity and not by limitation of the embodiments disclosed herein. Some of the plurality of RSOs may be closer to the Earth and less than LEOS orbital region 115, and/or larger than GEOS orbital region 120 (e.g., cislunar region outside of GEOS orbital region). Note that cislunar may refer to any region between the Earth and the orbit of the moon. Nevertheless, the at least one imaging device 20 may capture any RSOs entering the FOV 22.

In some embodiments, the field of view (FOV) 22 of the at least one imaging device 20 of an optical imaging system may be the angular extent of the observable world that may be seen at any given moment. The FOV may be described by the physical area which can be imaged, such as a horizontal or vertical field of view in mm, or alternatively, an angular field of view specified in degrees.

In some embodiments, the FOV 22 of the optical imaging system may be determined by a number of factors, including but not limited to the focal length of the lens, the size of the image sensor, and/or the aperture of the system. A lens with a shorter focal length may have a wider FOV than a lens with a longer focal length. A larger image sensor may also have a wider FOV than a smaller image sensor (see FIGS. 4 and 5). Finally, a system with a larger aperture may have a wider FOV than a system with a smaller aperture.

In some embodiments, the field of view (FOV) 22 having an optical axis 125 of the at least one imaging device 20 may be configured to image celestial objects falling within the field of view 22 such as any of the plurality of RSO 130 from a distance from the Earth ranging from the LEOS orbital region 115 through GEOS orbital region 120 into outer space.

In some embodiments, the space situational awareness (SSA) satellite optical payload (e.g., the at least one imaging device 20) may have the optical axis 125 of the FOV 22 configured to image a portion of the sky pointing at any arbitrary angle (e.g., the pointing angle as shown in FIG. 2A) relative to the origin 24 on the body of the satellite 15 along the orbital plane 25.

In some embodiments, the FOV 22 may have, for example, a ±10 deg cone relative to the optical axis 125 for performance optimization.

In some embodiments, the FOV 22 may have, for example, a ±15 deg cone relative to the optical axis 125 for performance optimization.

In some embodiments, the FOV 22 may have, for example, a ±20 deg cone relative to the optical axis 125 for performance optimization.

In some embodiments, the FOV 22 may have, for example, a ±25 deg cone relative to the optical axis 125 for performance optimization.

In some embodiments, the FOV 22 may have, for example, a ±30 deg cone relative to the optical axis 125 for performance optimization.

In some embodiments, the FOV 22 may have, for example, a ±35 deg cone relative to the optical axis 125 for performance optimization.

In some embodiments, the FOV 22 may have, for example, a ±40 deg cone relative to the optical axis 125 for performance optimization.

In some embodiments, the at least one imaging device 20 may be mounted on a motorized gimbal on the satellite 15. The motorized gimbal may be a device that uses motors to stabilize the at least one imaging device 20. The at least one imaging device 20 on a satellite might be mounted on a motorized gimbal so as: (1) To compensate for the motion of the satellite. Satellites may be constantly moving, and this motion may cause the at least one imaging device 20 to vibrate or shake. A motorized gimbal may be used to compensate for this motion and keep the imaging device stable. (2) To point the imaging device at specific targets (e.g., for changing the pointing angle of the at least one imaging device 20). Since satellites may be used to image a wide variety of targets, from the Earth's surface to distant galaxies, the motorized gimbal may be used to point the at least one imaging device 20 at specific targets, regardless of the satellite's orientation, (3) To track moving targets since some satellites may be used to track moving targets, such as aircraft or ships. A motorized gimbal may be used to keep the imaging device pointed at the moving target, even if the satellite may be moving in a different direction.

In some embodiments, the FOV 22 may be at a predefined orientation relative to a tangential component of the orbital velocity of the satellite 15 as shown previously in FIG. 2A. As the satellite 15 with at least one imaging device 20 moves along a given orbital plane 25, the field of view 22 also moves along the orbital plane 25 based on the orbital velocity of the satellite 15. The at least one imaging device 20 may be configured to acquire a plurality of images at predefined acquisition time intervals such as for example, but not limited to every 1 second. In this manner, each image will have a significant overlapping of features from the previous image where the overlapping coverage may be dependent on the orbital velocity and/or the predefined acquisition time intervals and/or the size of the FOV 22.

Note that there may be different coordinate systems for describing resident space objects (RSOs). For example, different organizations and applications may use different coordinate systems, based on their specific needs. Some of the most common space coordinate systems used for describing the position and/or location of RSOs in space may include:

Equatorial coordinate system: The equatorial coordinate system is a celestial coordinate system that may use the Earth's rotation axis as its reference point. It may be used to locate objects in the sky and is defined by two angles: right ascension (RA) and declination (Dec), which may also be known as RADEC. RA may be the angle measured eastward along the celestial equator from the vernal equinox to the object's hour circle, and Dec may be the angle measured north or south from the celestial equator to the object. The equatorial coordinate system may be a global coordinate system that may be used to locate objects anywhere in the sky. It may also be relatively easy to use since the RA and Dec coordinates (RADEC) of an object may be measured directly with a telescope or other astronomical instrument. This coordinate system may also refer to a Earth-Centered Inertial (ECI) coordinate system as described below.

Geocentric coordinate system (GCS): The GCS is a global coordinate system that may use the Earth's center as its origin. It may be commonly used for navigation and tracking purposes. The GCS may be defined by three coordinates: latitude, longitude, and altitude. Latitude may be the angle measured north or south from the Earth's equator, longitude may be the angle measured east or west from the prime meridian, and altitude may be the distance above the Earth's surface. The GCS may be used to describe the positions of RSOs relative to the Earth's surface.

Earth-Centered Inertial (ECI) coordinate system: The ECI coordinate system is a non-rotating coordinate system that may be also centered on the Earth. It may be commonly used for spacecraft orbit determination and propagation. The ECI coordinate system may be defined by three coordinates: X, Y, and Z. The X-axis may point towards the vernal equinox, the Y-axis may point towards the North Pole, and the Z-axis may point towards the center of the Earth. The ECI coordinate system may be used to describe the positions of RSOs relative to the Earth's center and the Sun.

Topocentric coordinate system: The topocentric coordinate system is a local coordinate system that may use a specific point on the Earth's surface as its origin. It may be commonly used for tracking and targeting RSOs. The topocentric coordinate system may be defined by three coordinates: azimuth, elevation, and slant range. Azimuth may be the angle measured clockwise from north to the object, elevation may be the angle measured above the horizon, and slant range may be the distance between the observer and the object. The topocentric coordinate system may be used to describe the positions of RSOs relative to a specific ground station or other observer.

The embodiments of the present disclosure may use and/or reference the Equatorial coordinate system as will be further described hereinbelow. However, this is not by way of limitation of the embodiments disclosed herein. Any suitable coordinate system may be used to map and/or track RSOs in the sky.

In some embodiments, a sun-synchronous orbit (SSO) may be a nearly polar orbit around a planet, in which the satellite may pass over any given point of the planet's surface at the same local mean solar time. Stated differently, it may be an orbit arranged so that the satellite may precess through one complete revolution each year, so as to maintain the same relationship with the Sun.

Sun-synchronous orbits may be achieved by having the osculating orbital plane precess (rotate) approximately one degree eastward each day with respect to the celestial sphere to as match with the Earth's movement around the Sun. As a result, the satellite's orbital plane may rotate once a year, so as to keep the satellite in the same relative position with respect to the Sun.

The main advantages of sun-synchronous orbits may include: (1) Reduced solar glare: Sun-synchronous orbits may be typically chosen so that the satellite may always be in sunlight, but the Sun may be at a low angle in the sky. This may reduce the amount of solar glare on the satellite's imaging sensors, which may improve the quality of the data. (2) Reduced thermal variations: Sun-synchronous orbits may help to reduce the amount of thermal variation that the satellite experiences. Since the satellite may always be in the same relative position with respect to the Sun, it may receive a consistent amount of sunlight so as to improve the performance of the satellite's instruments. Thus, sun-synchronous orbits may provide consistent lighting and thermal conditions, which may improve the quality and accuracy of the data collected as further described hereinbelow. (3) Enhance power management of the spacecraft from constant illumination of the solar panels 23.

Figure 2F:
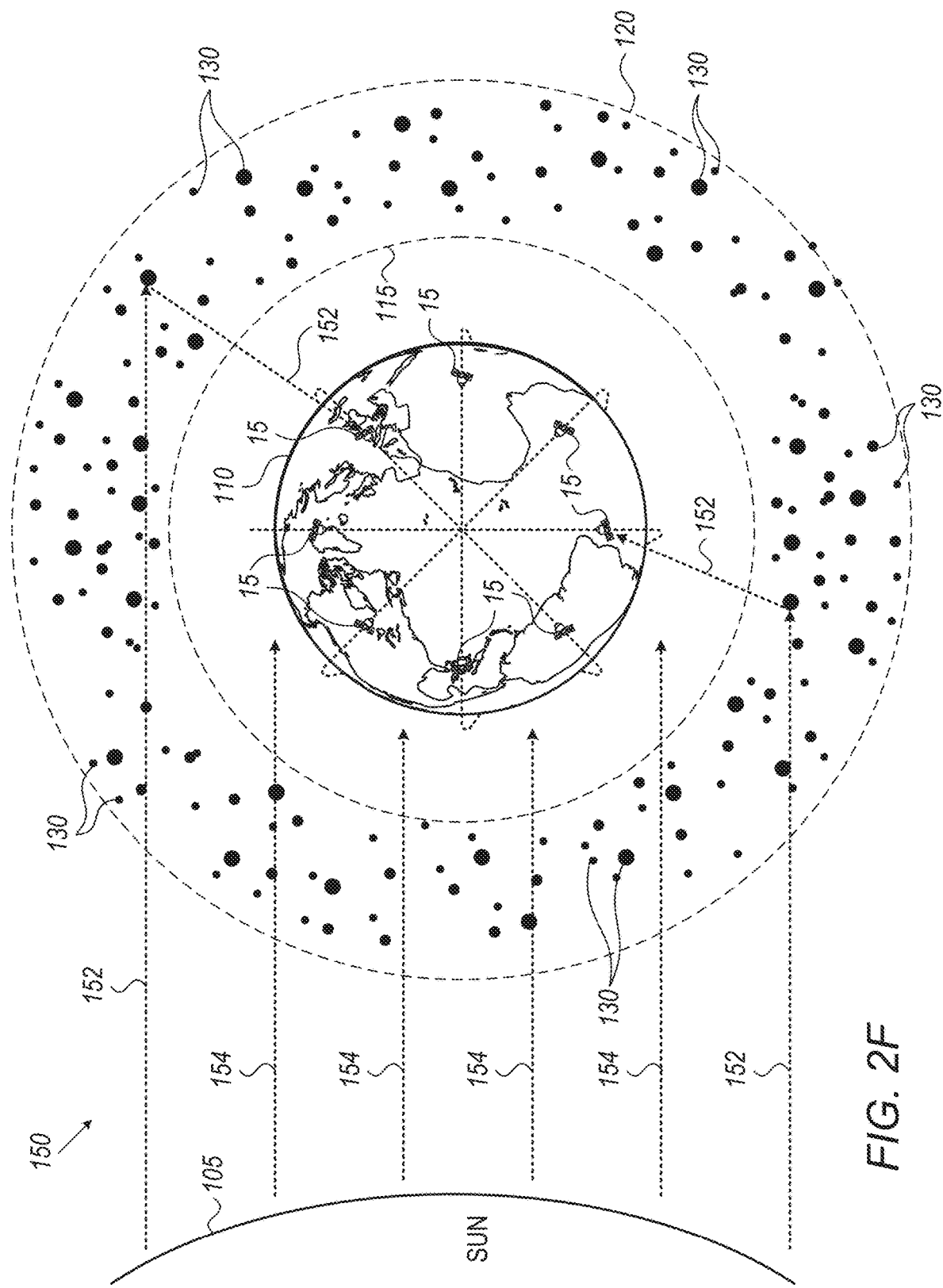
FIG. 2F is a schematic diagram of the plurality of resident space objects (RSO) in orbit about the celestial body and illuminated by the sun in accordance with one or more embodiments of the present disclosure.

FIG. 2F is a schematic diagram 150 of the plurality of resident space objects (RSO) 130 in orbit about the celestial body 110 and illuminated by the sun 105 in accordance with one or more embodiments of the present disclosure. Even though the FOV 22 of the at least one imaging device 20 may be pointing to any of the plurality of RSOs 130, an effective detection of these RSOs in the at least one imaging device 20 is dependent of the interception of sunlight (e.g., rays 152 of sunlight) that strikes a particular RSO and may be reflected into the FOV 22 of the at least one imaging device 20. In the exemplary embodiment shown in FIG. 2F, sunlight rays 152 strike an RSO that reflects the light into the camera of one of the plurality of satellites 15 as shown toward the top and bottom of FIG. 2F. Similarly, the Earth 110 may block sunlight rays 154 from the sun 105 from illuminating some of the plurality of RSOs 130 on the right side of the FIG. 2F in the exemplary embodiment. Accordingly, even though a particular RSO may be in a particular position in space (e.g., known particular right ascension and declination coordinates), if no light illuminates the particular RSO at the particular position (e.g., due to Earth shadowing), the presence of the particular RSO at the particular position may not be detectable by the at least one imaging device 20.

In some embodiments, the plurality of orbital planes may be sun-synchronous orbital planes.

Figure 2G:
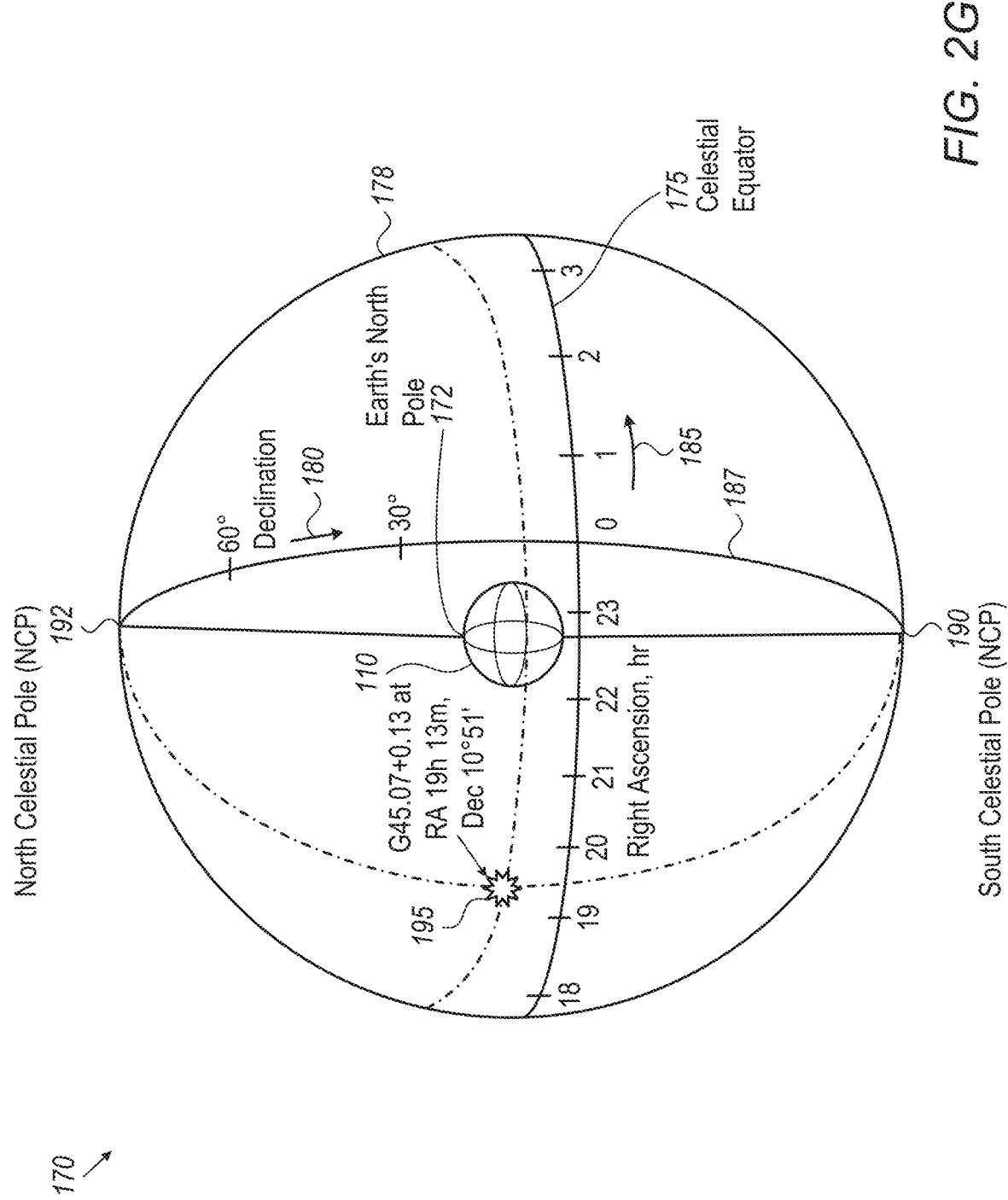
FIG. 2G is a schematic diagram illustrating locational representation object tracking in space in accordance with one or more embodiments of the present disclosure.

FIG. 2G is a schematic diagram 170 illustrating locational representation object tracking in space in accordance with one or more embodiments of the present disclosure. The exemplary embodiment shown uses the Earth 110 with the Earth's North pole 172 as a reference for a celestial sphere 178 surrounding the Earth 110. The celestial sphere 178 may include a celestial equator 175, a north celestial pole (NCP) 192, and a south celestial pole (SCP) 190. Declination (DEC) 180 may be the distance (North/South) from the celestial equator 175 that may be expressed in degrees. Similarly, right ascension (RA) 185 may be the distance (East/West) from a Vernal Equinox 187 that may be expressed in hours/minutes/seconds. The points of the celestial sphere 178 may be used to describe a position of any celestial body in space. Coordinates of an exemplary RSO 195 may be shown for visual clarity. Note that the orbital radius or a distance measurement from the Earth 110 to the RSO 195 may be further needed to characterize the orbital distance from the Earth 110 and/or the satellite 15.

It should be noted for the sake of clarity that an imaging coverage of the entire sky, or all of outer space, may refer to acquiring images covering the entire range of right ascension and declination values in space. However, imaging the entire sky may not be needed since the RSOs at some point in time may be on an orbital path that may be captured by the satellite imaging system. Hence, a portion of the sky may be imaged to determine the plurality of RSOs which may include both known and unknown RSOs. A database of known RSOs may be used to predict the expected location of each known RSO in the sky at a given time and within the portion of the sky to be imaged. In addition, based on orbit dynamics, all "unknown" RSOs may be foreseen to be observed in the satellite constellations as described in the embodiments disclosed herein.

In some embodiments, imaging cameras deployed on a predetermined number of satellites on a predetermined number of orbital planes (e.g., satellite constellation) may be used to provide the desired imaging coverage to image both known RSOs and unknown RSOs. That is, the satellite constellation may be configured to image a predetermined subset of the entire range of right ascension and declination values in space that may still cover the entire RSO population within a predetermined time of the mission sequence and where, in this predetermined subset of the entire range of right ascension and declination values, every RSO's path may cross the system's field of view (e.g., at least one FOV 22).

In some embodiments, based on the number of satellites in orbit for collecting the image data of the RSO population, the mission sequence to collect the image data may have a duration of at least one hour (but not limited to 1 hour to 24 hours), at least one day (but not limited to 1-7 days), at least one week (but not limited to 1-4 weeks), at least one month (but not limited to 1-12 months), at least one year (but not limited to 1-10 years), at least one decade, and so on.

Figure 3:
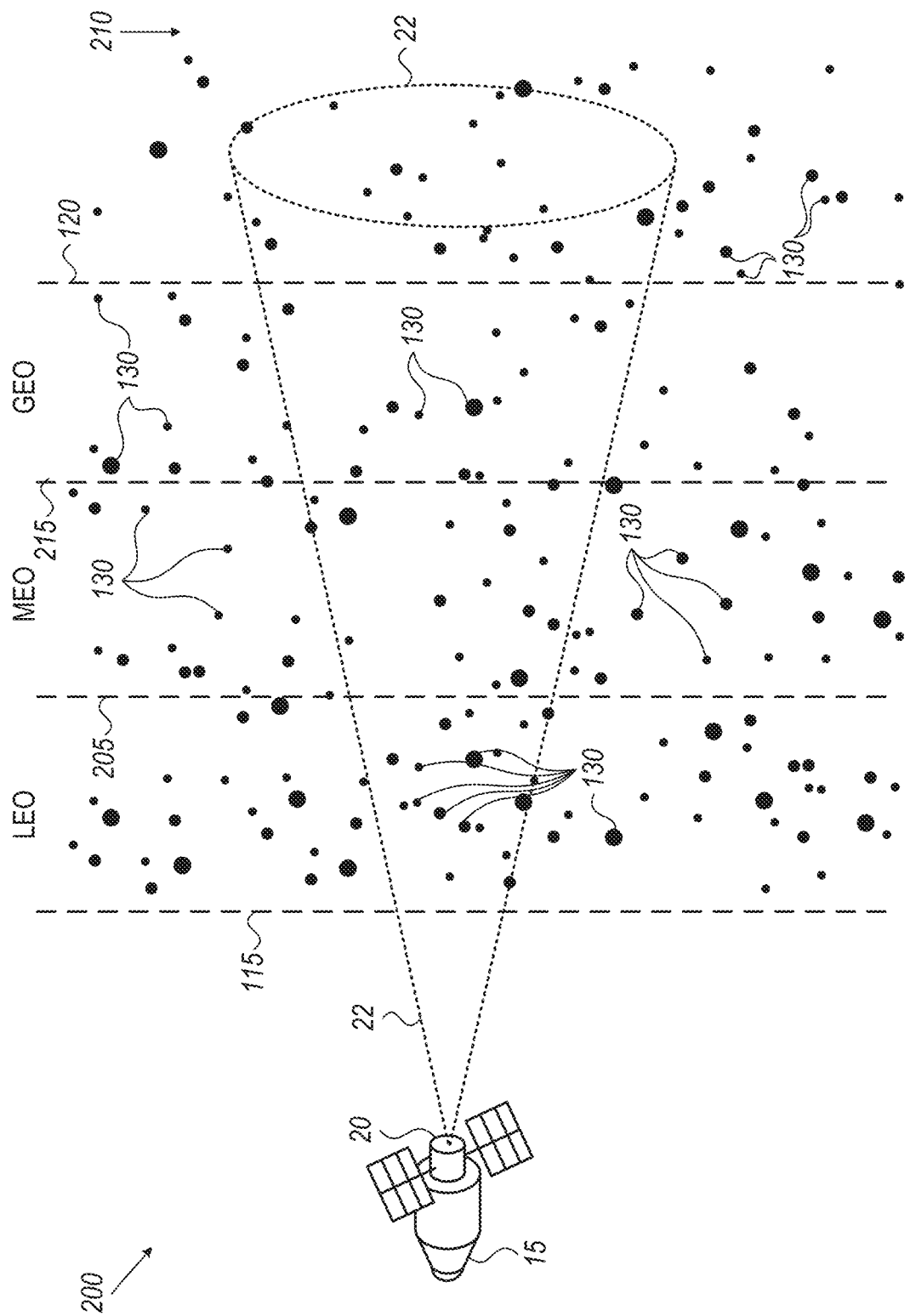
FIG. 3 is a schematic diagram of a satellite with an imaging device that is imaging a plurality of RSOs in accordance with one or more embodiments of the present disclosure.

FIG. 3 is a schematic diagram 200 of the satellite 15 with the at least one imaging device 20 that is imaging the plurality of RSOs 130 in accordance with one or more embodiments of the present disclosure. The at least one imaging device 20 may image the RSOs 130 captured within the FOV 22 from the start of the LEO orbital region 115 distance from Earth to the start of medium Earth orbital region (MEO) 205 to the start of the GEO orbital region 215 to the end of GEO orbital region 120 to cislunar 210 distances from the Earth 110. The at least one imaging device 20 may include at least one imaging optical arrangement that focus the light captured from any of the RSOs in the FOV 22 onto sensors in the at least one imaging device 20.

Figure 4:
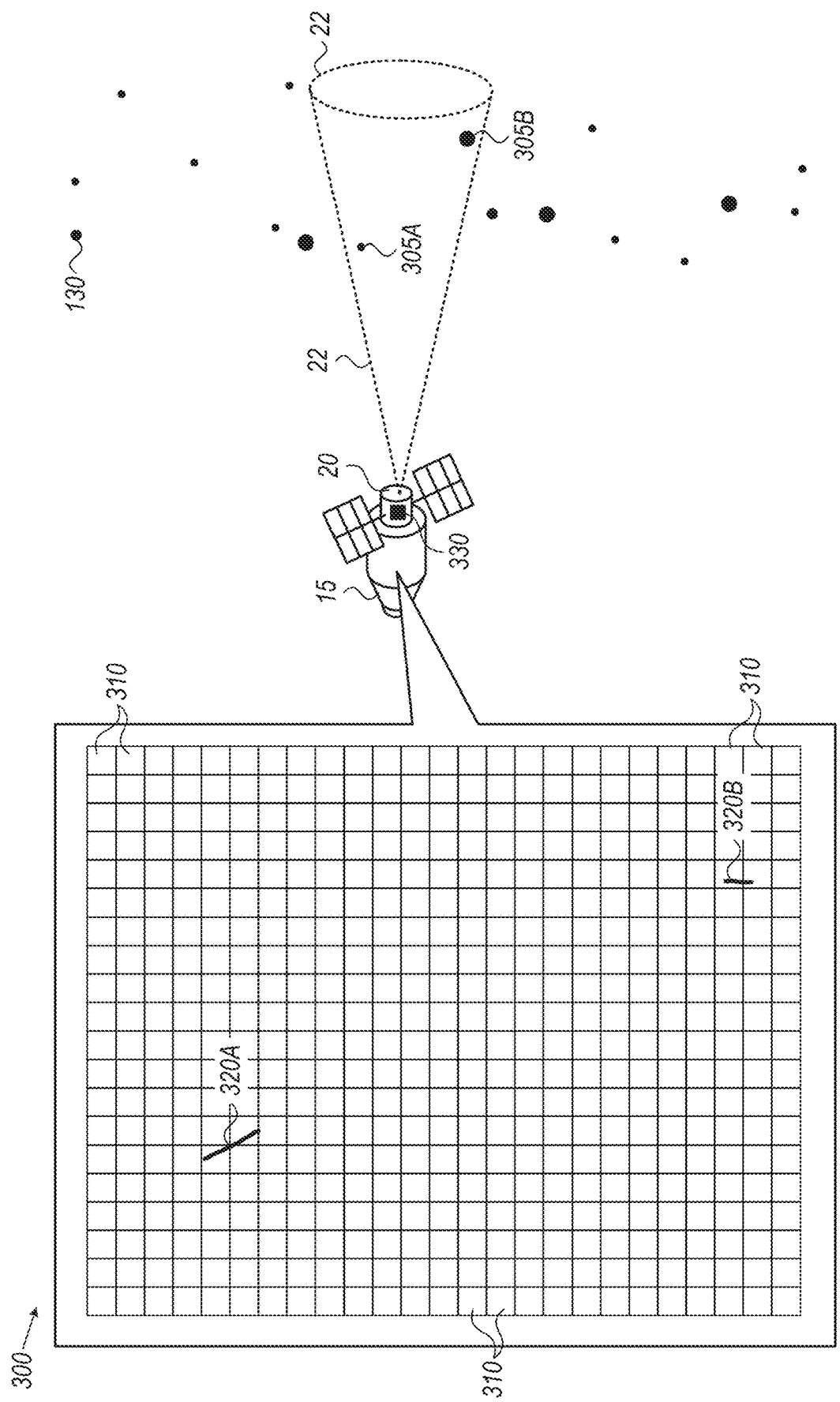
FIG. 4 is a schematic diagram of a plurality of sensors in an imaging device in accordance with one or more embodiments of the present disclosure.

FIG. 4 is a schematic diagram of at least one sensor array 300 of a plurality of sensors 310 in the at least one imaging device 20 in accordance with one or more embodiments of the present disclosure. The at least one imaging device 20 may include at least one imaging optical arrangement 330 that may further include but are not limited to optical lenses, optical filters, optical mirrors, polarizers, collimators, or any combination thereof. The at least one imaging optical arrangement 330 may focus the image in the field of view onto a sensor array in the at least one imaging device 20. The at least one imaging optical arrangement 330 may be controlled by the satellite processor 30 via the imaging device optics control circuitry 52. The satellite processor 30 may be configured via the imaging device interface circuitry 54 to receive image data from the at least one imaging device 20.

In some embodiments, the at least one sensor array 300 may represent a plurality of pixels by having the plurality of sensors 310 arranged in a regular grid. Each sensor in the array may be represented by a small square and may be responsible for detecting light from a specific point in the image. The brightness of each pixel in the image may be determined by the amount of light detected by the corresponding sensor in the sensor array. The number of sensors in an array may determine the resolution of the image so a higher resolution image may have more pixels to capture more detail.

In some embodiments, the plurality of sensors 310 may be configured to define a plurality of pixels to detect light through the at least one imaging optics and to generate image data of the image within the FOV 22. In the exemplary embodiment shown in FIG. 4, the at least one imaging device 20 may capture an image of two celestial image features from the light reflected from two RSOs denoted 305A and 305B in the FOV 22. The at least one imaging optical arrangement 330 may focus the reflected light from RSOs 305A and 305B onto the plurality of sensors 310. Since the RSOs 305A and 305B may be moving with very high orbital velocities, the light captured by the imaging optics 330 over a number of pixels from the plurality of pixels during the predefined image acquisition time (e.g., the frame-to-frame acquisition time). Note that RSO 305A is closer to the satellite 15 and thus, travels faster through the FOV 22 than RSO 305B, which generates a longer streak than RSO 305B. For example, the image of RSO 305A may be detected as a streak 320A encompassing two pixels as shown on FIG. 4. Similarly, the image of RSO 305B may be detected as a streak 320B encompassing 1.5 pixels as shown on FIG. 4.

In some embodiments, the angle of the streak on the at least one sensor array 300 may be indicative of the relative direction that the RSO and/or the other celestial body may be moving within the FOV 22. Similarly, the length of the streak may be indicative of the velocity of the RSO and/or the other celestial body moving within the FOV 22.

In some embodiments, satellite optical imaging sensors in imaging device 20 for an optical sensor array in a satellite camera may include, for example, but are not limited to charge-coupled devices (CCDs) or complementary metal-oxide-semiconductor (CMOS) sensors.

In some embodiments, CCDs may be image sensors that use an array of photosensitive cells to convert light into electrical signals. CCDs may be known for their high sensitivity and image quality.

In some embodiments, CMOS sensors may be image sensors that use an array of transistors to convert light into electrical signals. CMOS sensors may be less expensive to manufacture than CCDs, but they may also be less sensitive and produce lower image quality.

In some embodiments, the type of sensor that may be used in a satellite camera depends on the specific needs of the camera. For example, a satellite camera that may need to collect high-resolution images of the Earth's surface may use a CCD sensor. A satellite camera that needs to be low-cost and lightweight may likely use a CMOS sensor.

In some embodiments, some examples of satellite optical imaging sensors for an optical sensor array in a satellite camera may include panchromatic sensors, multispectral sensors, and hyperspectral sensors.

In some embodiments, panchromatic sensors may capture images in black and white. Panchromatic sensors may typically be used for high-resolution imaging applications, such as mapping and surveillance.

In some embodiments, multispectral sensors may capture images in multiple wavelengths of light. Multispectral sensors may typically be used for remote sensing applications, such as monitoring vegetation and land use.

In some embodiments, hyperspectral sensors may capture images in hundreds or even thousands of wavelengths of light. Hyperspectral sensors may typically be used for scientific research applications, such as studying minerals and gases.

In some embodiments, infrared sensors may capture images in infrared wavelength ranges. For example, short wavelength infrared (SWIR) sensors may operate in the 1.4-3 µm wavelength range. Mid-wavelength infrared (MWIR) sensors may operate in the 3-8 µm wavelength range. Long wavelength infrared (LWIR) sensors may operate in the 8-15 µm wavelength range.

In some embodiments, the plurality of sensors may detect light having a light intensity above a predefined detection threshold. The predefined detection threshold may depend on the type of sensor used in the array.

Figure 5:
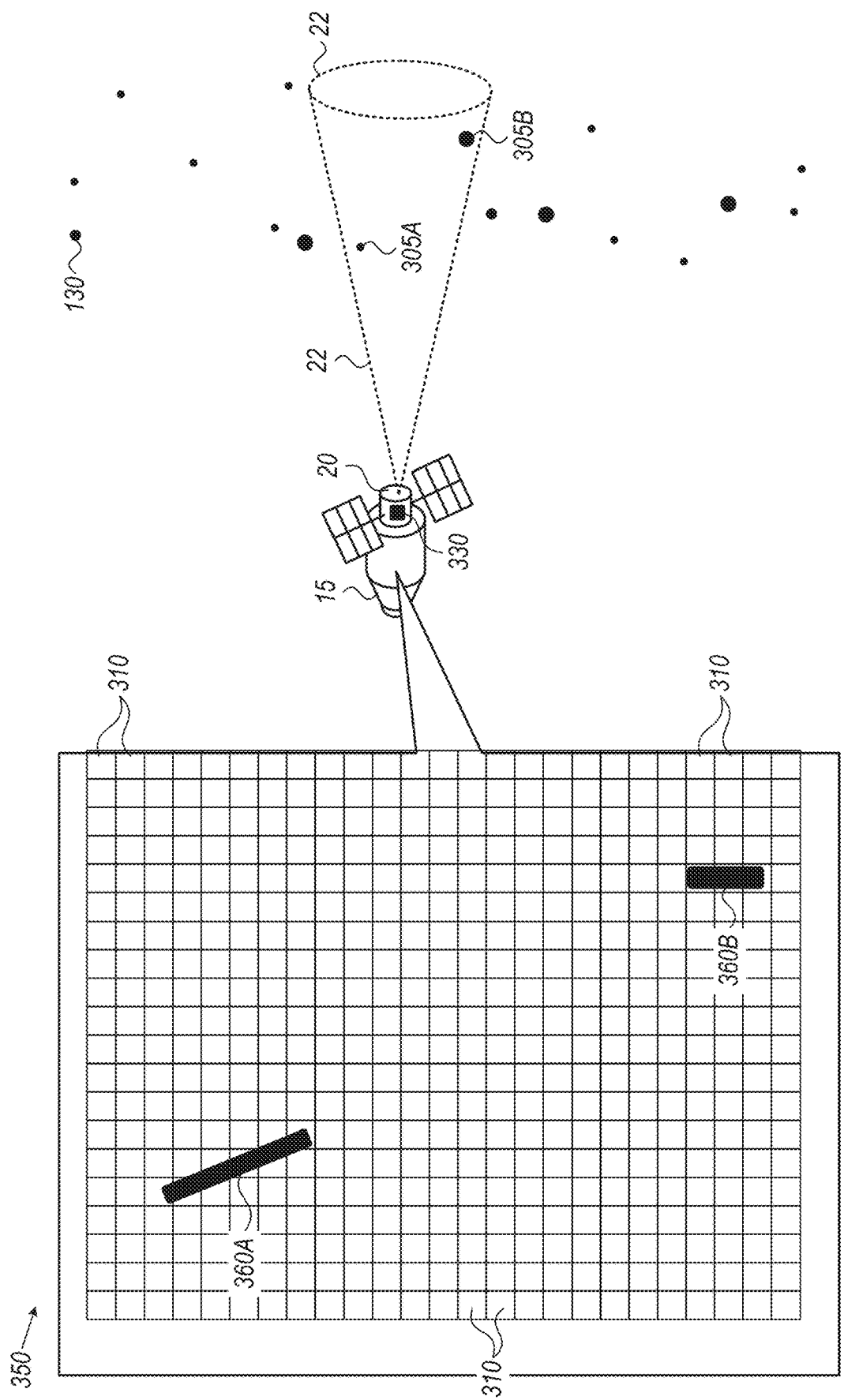
FIG. 5 is a schematic diagram of a plurality of sensors in an imaging device in accordance with one or more embodiments of the present disclosure.

FIG. 5 is a schematic diagram of a sensor array 350 of the plurality of sensors 310 in the at least one imaging device 20 in accordance with one or more embodiments of the present disclosure. The celestial image features may be used in part to determine the position and/or velocity of the imaged RSOs and/or other celestial bodies in the FOV 22 captured in the sky. The data retrieved in each of the images may be used in advanced algorithms to identify the RSO and to determine the orbit of the RSO around the Earth. However, to improve the positional detection accuracy for use in the algorithms, the image of the celestial image features may by acquired when the imaging optics 330 may be defocused.

In some embodiments, the imaging optics 330 may be used to increase the accuracy of the celestial image features by defocusing the imaging optics 330 by the control circuitry 52 with a preset defocusing parameter. The defocusing spreads the image of each celestial image feature uniformly over a preset number of pixels in the plurality of pixels based on the preset defocusing parameter. Thus, in comparing the embodiments of FIG. 4 to the embodiments of FIG. 5, the image of RSO 305A may be detected as a defocused streak 360A encompassing about 5 pixels as shown on FIG. 5. Similarly, the image of RSO 305B may be detected as a defocused streak 360B encompassing 2.5 pixels as shown on FIG. 5. Again, the longer defocused streak 360A corresponding to RSO 305A is due to the orbital speed being larger than RSO 305B.

In some embodiments, the matched filters 78 may be applied to streaks in the raw image data from moving RSOs to improve detection.

In some embodiments, for the type of sensors used, the preset defocusing parameter may cause the image to spread uniformly over a predetermined number of additional pixels, such as for example, but not limited to 2 to 3 additional pixels, for example, for detection sensitivity improvement. In other embodiments, the preset defocusing parameter may cause the image to spread uniformly over a predetermined number of additional pixels, such as for example, but not limited to 4 to 9 additional pixels, for example, for detection sensitivity improvement.

In some embodiments, the preset defocusing parameter may be kept constant over a mission sequence. In other embodiments, the preset defocusing parameter may be changed by the satellite processor 30 during a mission sequence.

In some embodiments, the plurality of sensors may be calibrated for various environmental conditions and to account for the effect of different environmental conditions on the detection using preset defocusing parameters. For example, when the temperature changes, the detected RSO streaks and/or the detected stars patterns may shift. The application of at least one calibration parameter to the plurality of sensors may be used to correct for these changing environmental-based detection impairments.

In some embodiments, the at least one calibration parameter may be kept constant over a mission sequence. In other embodiments, the at least one calibration parameter may be changed during a mission sequence.

In some embodiments, other calibrations for satellite optical imaging sensors for an optical sensor array in a satellite camera may include but are not limited to radiometric calibration, spectral calibration, geometric calibration, line of sight calibration, and/or flat field calibration.

In some embodiments, radiometric calibration may be used to ensure that the sensor is accurately measuring the intensity of light. This may be done by comparing the sensor's output to a known source of light.

In some embodiments, spectral calibration may be used to ensure that the sensor is accurately measuring the wavelength of light. This may be done by comparing the sensor's output to a known source of light with a known spectrum.

In some embodiments, geometric calibration may be used to ensure that the sensor is accurately measuring the position of objects in the scene. This may be s done by comparing the sensor's output to a known imaging scene with a known geometry.

In some embodiments, line of sight calibration may be used to ensure that the sensor may be pointing in the correct direction. This may be done by comparing the sensor's output to a known scene with known geometry.

In some embodiments, flat field calibration may be used to correct for any non-uniformity in the sensor's response. This may be done by imaging a uniform scene and then using the image to create a correction map.

In some embodiments, these calibrations may typically be performed before the satellite is launched and/or may periodically be performed throughout the satellite's mission.

In some embodiments, the calibrations may be performed using a variety of methods, which may include ground-based calibration facilities, on-board calibration systems, and/or in-flight calibration procedures.

In some embodiments, the satellite optics may be preset with the preset defocusing parameter. Thus, the embodiment shown in FIG. 4 is merely for conceptual clarity in explaining the defocusing embodiment of FIG. 5 and not representative of the acquired images used for analyses. The acquired images used for position and orbital analyses of the orbiting resident space objects may include the defocused streaks for improved RSO detection as shown in FIG. 5.

Figure 6:
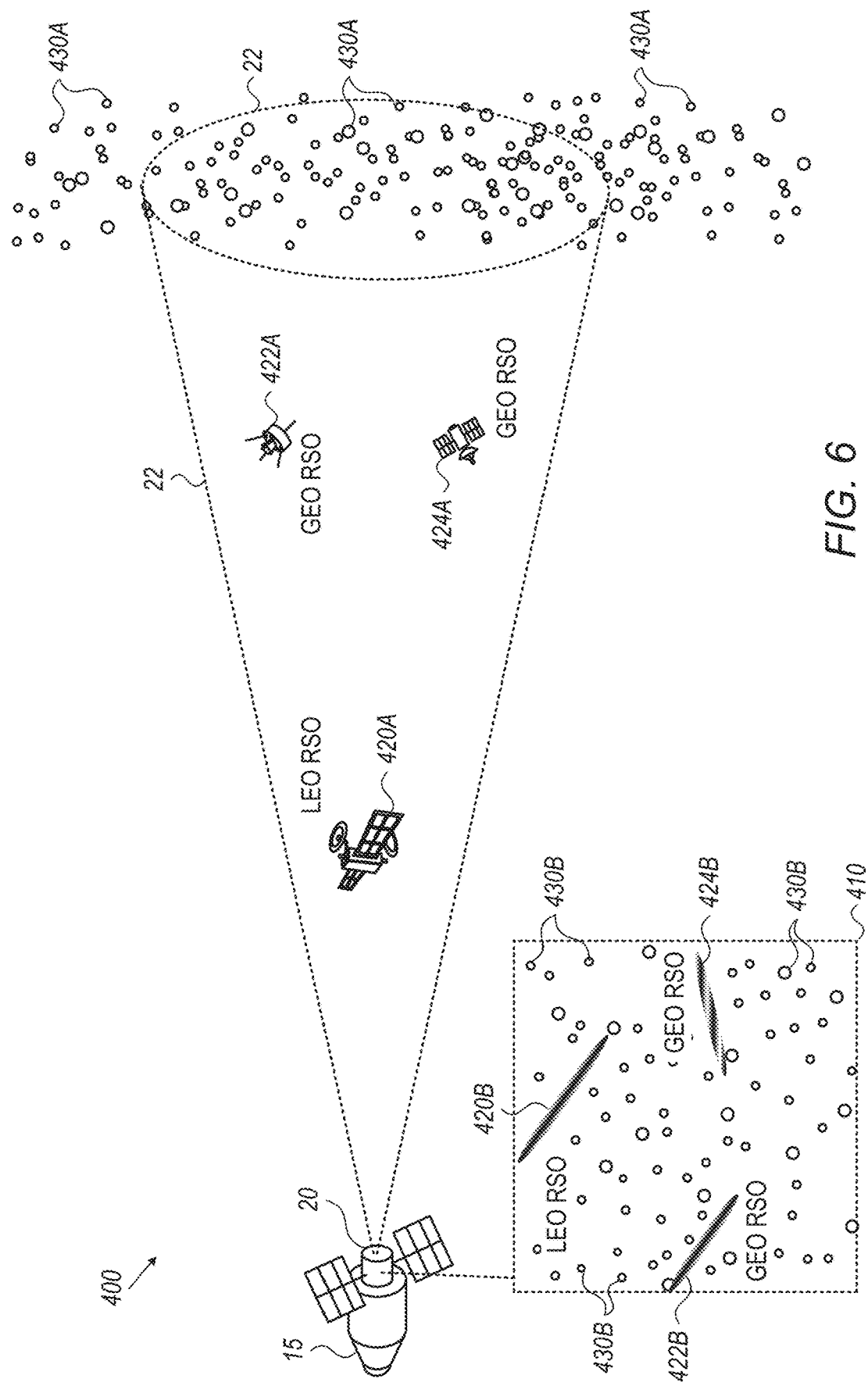
FIG. 6 is a schematic diagram of an acquired image with celestial image features corresponding to imaged RSOs and stars in outer space in accordance with one or more embodiments of the present disclosure.

FIG. 6 is a schematic diagram of an acquired image 410 with celestial image features corresponding to imaged RSOs and stars in outer space in accordance with one or more embodiments of the present disclosure. The at least one imaging device 20 of the satellite 15 may image a LEO RSO 420A, a first GEO RSO 422A, a second GEO RSO 424A and a plurality of stars 430A with the FOV 22. Note that in contrast to FIG. 3 regarding the scale of distances from the satellite 15 to the object of interest, the plurality of stars 430A may be far outside of the solar system. The at least one satellite processor may generate image data forming the image 410 with the celestial features: the LEO RSO celestial feature (streak) 420B, the first GEO RSO celestial feature 422B, the second GEO RSO celestial feature 424B, and star celestial features 430B. Note that the streak of the LEO RSO celestial feature may be longer than that of the GEO RSO celestial feature since the LEO RSO 420A is closer to the at least one imaging device 20 than the GEO RSOs (422A and 424A) and moving faster through the FOV 22 relative to the GEO RSOs.

Note that the plurality of stars 430A may be moving at large velocities but due to the distances from the plurality of the stars 430A to the at least one imaging device 20, the streaking of respective plurality of celestial image features from the stars 430B may be less pronounced than the much closer RSOs (e.g., the LEO RSO 420A, the first GEO RSO 422A, and the second GEO RSO 424A).

In some embodiments, the detected light in the at least one imaging device 20 may be reflected from or generated by the at least one other celestial body, the at least one RSO, or any combination thereof to the imaging optics 330 within the FOV 22 from a minimum to a maximum distance away from each satellite. The minimum distance may be RSOs located at the start of the LEO orbital distance range 115. The maximum distance may be the distance to stars far outside of the solar system.

In some embodiments, the detected light captured in the FOV 22 may be from the at least one RSO that may be located at a minimum distance from the start of the LEO orbital region 115 and into a cislunar 210 region (maximum) distance away from each satellite 15. In some embodiments, the minimum and the maximum distance may be relative to the Earth such as for example, where the minimum and the maximum distance may follow the radial vector from the center of the Earth.

In some embodiments, the detected light captured in the FOV 22 may be from the at least one other celestial body that may be located from the minimum distance away from each satellite 15 at the start of LEOs 115 and to a maximum distance outside of the solar system. The detected light from the at least one celestial body may include detected streaks from a plurality of stars and/or planets. This may be used to detect particular stars from the plurality of stars spatially arranged in specific star constellations.

In some embodiments, the advanced algorithms to identify the RSO at particular locations in space may use the shape and/or position of star celestial features from imaged star constellations that may be captured in the image data of the acquired image 410.

Figure 7:
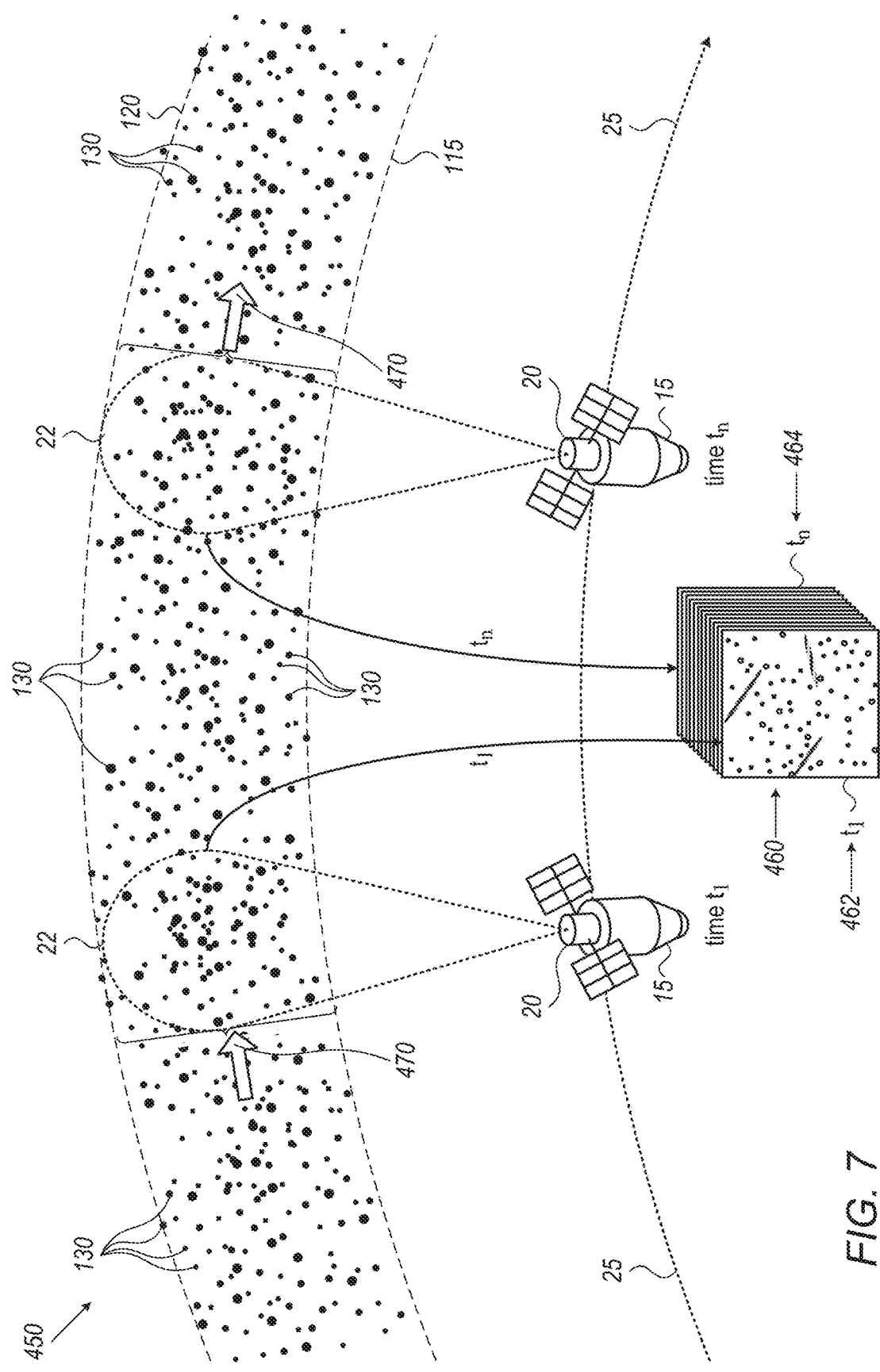
FIG. 7 is schematic diagram of an imaging device on a satellite generating a plurality of images of RSOs in accordance with one or more embodiments of the present disclosure.

FIG. 7 is schematic diagram of the at least one imaging device 20 on the satellite 15 generating a plurality of images of RSOs 130 in accordance with one or more embodiments of the present disclosure. As the at least one imaging device 20 acquires an image of the sky at predefined acquisition time intervals, image data within the FOV 22 may be acquired as the satellite moves in the orbital plane 25 at a time $t_1$ to time $t_n$, where n is any integer, and $t_n$-$t_{n1}$ is the predefined acquisition time intervals such as for example, but not limited to 1 second or one frame per second.

In some embodiments, a single satellite such as the satellite 15 in the orbital plane may acquire a plurality of images 460. For example, an image 462 from the at least one imaging device 20 of the satellite 20 may be acquired at a position along the orbital plane 25 at time $t_1$, and similarly an image 464 from the at least one imaging device 20 of the satellite 20 may be acquired at a position along the orbital plane 25 at time $t_n$. In effect, the FOV 22 sweeps in an arc as the satellite 15 moves in the orbital plane 25 and generates a plurality of images of celestial image features of orbiting RSOs 130 within the FOV 22 from the LEOS orbital region 115 to the GEOS orbital region 120 as shown in FIG. 7. Thus, the FOV 22 may collect celestial image features representative of RSOs 130 within a three-dimensional imaging volume 470 in space (shown as a two-dimensional projection in FIG. 7) generated by the FOV 22 as it moves in a circle along the orbital plane 25, and images of RSOs located between but not limited to the concentric circles bounded from the beginning of the LEOS orbital region 115 to the end of the GEOS orbital region 120 within that volume. Note that a portion of the three-dimensional imaging volume 470 is shown in FIG. 7 between times $t_1$ and $t_n$. However, the three-dimensional imaging volume 470 will be concentric-like in shape once a full orbit is complete.

In some embodiments, the at least one imaging device 20 may also capture other celestial bodies outside these concentric circles such as planets and/or stars (not shown in FIG. 7).

In some embodiments, the frame-to-frame feature coverage and degree of overlap in the captured celestial image features between images taken at $t_n$ and $t_{n-1}$ may be used in determining the optimal predefined acquisition time intervals. Conversely, the predefined acquisition time interval may determine the desired frame-to-frame feature coverage.

As a non-limiting example, suppose a 90% overlap of celestial image features taken between successive images at time $t_n$ and time $t_{n-1}$ is desired, 90% of the celestial image features from the image frame at time $t_n$ will appear in the image frame at time $t_{n-1}$ Stated differently, 90% of the same celestial image features may be observed between images taken at $t_n$ and $t_{n-1}$ in addition to any new captured celestial image features.

Thus, for the case as shown in FIG. 7, a single satellite 15 may generate image data for the plurality of images 460 with a predefined acquisition time interval. The image data for the plurality of images may be stored, for example, in the image database 40. However, the RSOs, each in its own orbit about the Earth that may be captured in the plurality of images 460 may be limited to the three-dimensional imaging volume 470 in space depending on the area of the FOV 22.

Furthermore, in addition to the satellite in motion along the orbital plane 25, each of the RSOs 130 may also be in orbit in its own orbital plane that is not typically contiguous with the orbital plane 25 of the imaging satellite. Accordingly, the FOV 22 may capture a few images of a particular RSO as a streak cutting across the three-dimensional imaging volume 470 in the few images when the particular RSO cuts into the three-dimensional imaging volume 470 instantaneously in the time that the at least one imaging device 20 on the satellite 15 acquires the image of the particular RSO. These effects are mitigated when increasing the imaging coverage of the RSO to include the entire sky.

In some embodiments, increasing the imaging coverage of RSOs to cover a larger portion of the entire sky (e.g., where the entire sky may refer to all values of RA and DEC) may be done by: (1) increasing the size of the FOV 22, (2) more satellites on the same orbital plane will increase the celestial image features of the RSOs but over the same three-dimensional imaging volume 470, and/or (3) increasing the number of satellites over a plurality of orbital planes, each orbital plane with its unique three-dimensional imaging volume 470.

FIG. 8 is schematic diagram of three imaging devices on three satellites 15A, 15B, and 15C respectively generating a plurality of images 460A, 460B, and 460C in accordance with one or more embodiments of the present disclosure. Note that the three satellites 15A, 15B, and 15C may be along the same orbital plane 25. But as the RSOs move across the three-dimensional imaging volume 470 at different times, the image data from the plurality of images 460A, 460B, and 460C will capture the same space but at different times. Thus, a different set of RSOs from the plurality of RSOs 130 may be captured at the different times.

In some embodiments, extending the exemplary embodiments shown in FIG. 8 which shows imaging devices with three fields of view 22A, 22B, and 22C on three satellites on one orbital plane to a plurality of satellites on a plurality of orbital planes such as shown in FIGS. 2A and 2B will provide a coverage of RSOs for imaging in a portion of the entire sky. Stated differently, a plurality of three-dimensional imaging volumes (e.g., three-dimensional imaging volume 470 from a single satellite) from the plurality of satellites may merge together to provide more images of a larger portion of the sky in which the RSOs may be expected to be present.

In some embodiments, a particular mission sequence may be targeted to acquire image data with a desired coverage of RSOs in various orbit types about the Earth anywhere within the LEOS region to cislunar regions. Since the RSOs travel in different orbits and may be located in different places in at different times in space in those different orbits, a few imaging cameras on a few satellites may achieve the desired coverage to capture the RSOs over a long period of time, or a larger number of satellites orbiting the Earth in various orbital planes may be used to achieve coverage of the RSOs in a shorter period of time (e.g., shorter temporal coverage). Eventually, a particular RSO will cross the coverage span of a particular satellite constellation.

Stated differently using a non-limiting example, in some embodiments, for a predetermined number of RSOs to be captured, three satellites in one orbital plane may take much longer time to image the predetermined number of RSOs than 24 satellites in eight orbital planes, for example. The latter constellation of 24 satellites has a shorter temporal coverage than the three-satellite constellation. In other embodiments, the eight orbital planes for the non-limiting example may be respectively oriented to each other at two hours in clock angle hours, for example.

In some embodiments, each orbital plane may deliver high fidelity space situational awareness information services to a plurality of customers and/or users. The satellite constellation on a single orbital plane may have failure redundancy since if one satellite fails, there are still other functioning satellites on the same orbital plane to cover the same three-dimensional imaging volume.

In some embodiments, subscription services may be provided to the plurality of customers and/or users to provide a continuous mapping and monitoring in space such as for example, but not limited to LEO to GEO monitoring.

In some embodiments, each satellite may include a broadband optical payload in that the plurality of sensors may be configured to not only operate in visible light frequencies but also in infrared frequencies to detect RSOs particularly when the at least one imaging device 20 may be on an orbital plane where part of the orbit may be pointing to the sun 105.

In some embodiments, the plurality of sensors and/or the optical frontend circuitry may be configured to handle multiple frequency ranges for optimizing RSO detection.

FIG. 9 is a flowchart of an illustrative, non-limiting computer-based method 500 for generating a plurality of celestial image features from a plurality of images of a sky in accordance with one or more embodiments of the present disclosure. The method 500 may be performed by the at least one satellite processor 30 of the satellite 15 and/or by the processor 70 of the centralized computer 70. Both of these processing unit may work separately or in tandem to use the image data collected by the plurality of satellites 15 and to generate an image map of celestial features by the celestial image feature generator 79.

The method 500 may include instructing 510 instructing a plurality of satellites in orbit around a celestial body in at least one orbital plane to store celestial feature metadata of each image from a plurality of images, where each satellite from the plurality of satellites includes at least one satellite processor; a non-transitory satellite computer memory, a satellite communication circuitry, at least one imaging device, where the at least one imaging device includes at least one imaging optical arrangement and a plurality of sensors, where the at least one imaging optical arrangement is configured to have a field of view (FOV) to capture an image of a sky, where the image of the sky captured by the at least one imaging device within the FOV includes at least one celestial image feature that is representative of at least one of: at least one other celestial body or at least one other celestial body and at least one resident space object (RSO), where the plurality of sensors is configured to define a plurality of pixels to detect light through the at least one imaging optical arrangement and to generate image data of the image within the FOV, where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter.

The method 500 may include instructing 520 at least one satellite processor to iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane.

The method 500 may include instructing 530 the at least one satellite processor to store the celestial feature metadata in the non-transitory satellite computer memory for each image from the plurality of images, where the celestial feature metadata includes: the image data, a camera shutter open duration data, satellite system data, a sensor integration time data, and an acquisition timestamp data.

The method 500 may include instructing 540 at least one centralized computer processor to receive the celestial feature metadata of each image from the plurality of images from the plurality of satellites in orbit around the celestial body in the at least one orbital plane.

The method 500 may include instructing 550 the at least one centralized computer processor to generate at least 1,000 celestial image features based on the celestial feature metadata from the plurality of images detected in a portion of the sky.

Figure 10:
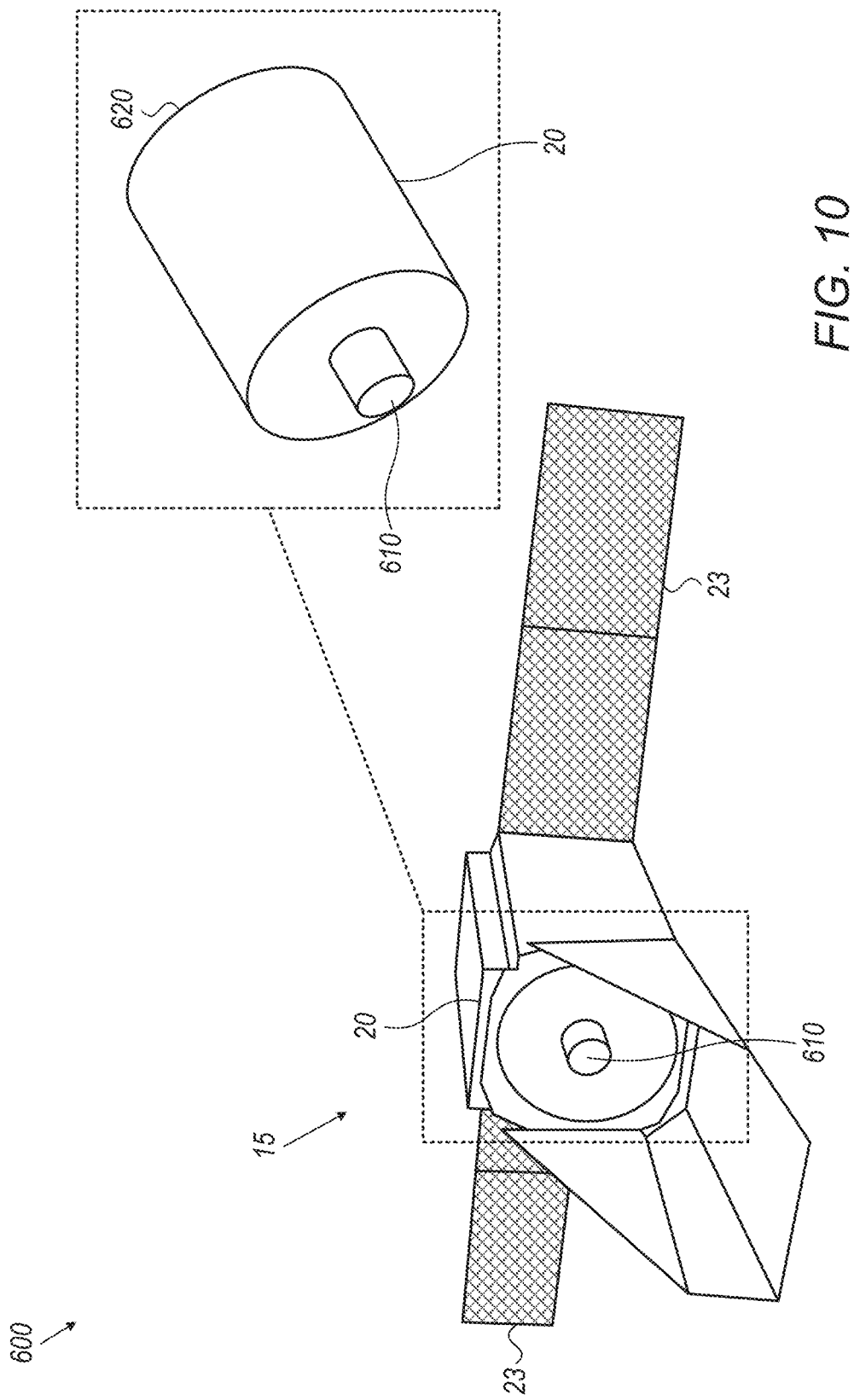
FIG. 10 is a diagram of an exemplary satellite in accordance with one or more embodiments of the present disclosure.

FIG. 10 is a diagram 600 of an exemplary satellite 15 in accordance with one or more embodiments of the present disclosure. The satellite 15 may have at least one deployable baffle, at least one low light visible (VIS) optical system and/or at least one near infrared (NIR) optical system and at least one high bandwidth Ku band downlink (e.g., the communication circuitry 50). In other embodiments, the communication circuitry 50 may be bidirectional with downlink and uplink.

In some embodiments, the ground network and spacecraft operation may be managed by a single operational system with numerous ground stations worldwide and a cloud-based operation deployment.

In some embodiments, the satellite 15 may include, for example, at least one imaging device 20 (e.g., the payload) may include the at least one sensors and control circuitry 52 in a sensor head 610 and at least one optical front-end circuitry 620 (e.g., the communication circuitry 50 and/or image device interface 54).

In some embodiments, the satellite payload instrument may have a primary optical diameter of 235 mm, an instantaneous field of view (e.g., FOV 22) of 37.88 rad, a pixel size between any the pixels 310 of 10 µm, and a sensor full well (e.g., no. of electrons per pixel) of 14000 $e^-$.

In some embodiments, the payload data downlink may be in the Ku-band frequency range.

In some embodiments, a satellite control system (SCS) implemented by the at least one satellite processor 30 and/or the at least one centralized computer processor 75 may control the attitude, orbit, and/or payload of a satellite. SCSs may ensure that satellites operate correctly and efficiently.

In some embodiments, SCSs typically may include but are not limited to the following components: (1) a plurality of positional sensors may be used to collect data about the satellite's attitude, orbit, and/or payload. This data may be used by the SCS to make decisions about how to control the satellite. (2) A plurality of actuators may be used to control the satellite's attitude, orbit, and/or payload. Actuators may typically include thrusters, reaction wheels, and/or magnetic torquers. (3) At least one computer (e.g., the at least one satellite processor 30 and/or the at least one centralized computer processor 75) for processing the data from the sensors and transmitting commands to the actuators.

In some embodiments, SCSs may be ground-based or on-board the satellite.

In some embodiments, ground-based SCSs may communicate with satellites via radio waves or lasers.

In some embodiments, on-board SCSs may be more autonomous than ground based SCSs but may not need to rely on communication with the ground.

In some embodiments, the satellite may include a global positioning system unit (GPS) to facilitate the use of GPS technology such as to track the position and velocity of a satellite. GPS receivers are typically used on satellites for the following purposes for navigation. This may be used for satellites that need to maintain a specific position in space, such as communications satellites and Earth observation satellites.

In some embodiments, GPS receivers may be used to synchronize the clocks on satellites. This is important for satellites to accurately communicate with each other, such as navigation satellites and remote sensing satellites.

In some embodiments, GPS receivers may be used to determine the attitude of a satellite, which is its orientation in space. This may be used for satellites that need to point their instruments at specific targets, such as Earth observation satellites and scientific satellites.

In some embodiments, GPS receivers on satellites may need to operate in a harsh environment and to provide very accurate positioning and timing information.

In some embodiments, GPS receivers may typically be mounted on the outside of the satellite (such on a motorized gimbal) and may be pointed at the sky. This may allow the GPS receiver to receive signals from all of the GPS satellites that are in view. The GPS receiver then uses these signals to calculate the satellite's position and velocity.

In some embodiments, any of the plurality of satellites 15 may include an onboard satellite propulsion system that may use thrusters to change the velocity and/or orientation of the satellite in space.

In some embodiments, propulsion systems may allow the satellite to maintain a specific orbit, maneuver to new orbits, and/or point their instruments at specific targets. In other embodiments, any of the plurality of satellites may include a chemical propulsion system and/or an electric propulsion system.

In some embodiments, chemical propulsion systems may use chemical reactions to produce thrust. Chemical propulsion systems may be more powerful than electric propulsion systems but may also be less efficient and have less propellant capacity.

In some embodiments, electric propulsion systems may use electricity to accelerate ions or plasma to produce thrust. Electric propulsion systems may be less powerful than chemical propulsion systems, but they may be more efficient and have more propellant capacity.

In some embodiments, the type of onboard satellite propulsion system that may be used depends on the specific needs of the satellite. For example, a satellite that may need to maintain a high-altitude orbit may likely use an electric propulsion system, since electric propulsion systems may be more efficient and have more propellant capacity. Conversely, a satellite that may need to perform rapid maneuvers may use a chemical propulsion system, since chemical propulsion systems are more powerful.

In some embodiments, different types of onboard satellite propulsion systems may include for example but not limited to chemical propulsion systems that use monopropellant systems and/or bipropellant systems.

In some embodiments, monopropellant systems may use a single propellant, such as hydrazine, to produce thrust. Monopropellant systems may be simple and reliable, but they are less efficient than other types of chemical propulsion systems. Bipropellant systems may use two propellants, such as hydrazine and nitrogen tetroxide, to produce thrust. Bipropellant systems are more efficient than monopropellant systems, but they may be more complex and less reliable.

In some embodiments, electric propulsion systems may include electrothermal propulsion systems, electrostatic propulsion systems, and/or electromagnetic propulsion systems.

In some embodiments, electrothermal propulsion systems may use electricity to heat a propellant, which then expands through a nozzle to produce thrust. Electrothermal propulsion systems may be relatively simple and reliable, but they may also be less efficient than other types of electric propulsion systems.

In some embodiments, electrostatic propulsion systems may use electricity to accelerate ions to produce thrust. Electrostatic propulsion systems may be very efficient, but they may also be less powerful than other types of electric propulsion systems.

In some embodiments, electromagnetic propulsion systems may use electricity to accelerate plasma to produce thrust. Electromagnetic propulsion systems may be very powerful and efficient, but they may also be complex and expensive.

In some embodiments, any of the satellites from the plurality of satellites may include two main types of satellite power modules: solar power modules and nuclear power modules.

In some embodiments, solar power modules may use solar cells to convert sunlight into electricity. Solar power modules may be the most common type of power module used on satellites, as they are lightweight, reliable, and have a long lifespan.

In some embodiments, nuclear power modules may use nuclear reactors to generate electricity. Nuclear power modules may be used on satellites that require high levels of power, such as communications satellites and scientific satellites.

In some embodiments, solar power modules such as the solar panels 23 may be further divided into two types: rigid solar arrays and flexible solar arrays.

In some embodiments, rigid solar arrays may include rigid solar panels that are mounted on the satellite. Rigid solar arrays may typically be more efficient than flexible solar arrays, but they may also be heavier and less flexible.

In some embodiments, flexible solar arrays may include thin, flexible solar panels that may be mounted on the satellite in a variety of ways. Flexible solar arrays may be less efficient than rigid solar arrays, but they may also be lighter and more flexible.

The system elements shown in FIGS. 1A and 1B disclosed herein may be implemented in software or firmware or a combination of them or as instructions stored on a machine-readable medium, which may be read and executed by one or more processors such as any of the plurality of satellite processors 30 and/or the at least one centralized computer processor 75. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth (e.g., any of the plurality of satellite processors 30 and/or the at least one centralized computer processor 75). In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.). This may be implemented by any of the software modules to perform the functions disclosed herein and executed by any of the plurality of satellite processors 30 and/or the at least one centralized computer processor 75.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure such as for example the image data of from the plurality of images 460 may be configured to securely store and/or transmit data (such as the acquired image data 45A) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). Thus, the image data collected from any of the plurality of satellites 15 may be encrypted and transmitted to the centralized computer 70 such as the ground base station and decrypted by the at least one processor 75.

In some embodiments, the raw image data may be encrypted by any of the plurality of satellite processors and decrypted by the at least one centralized computer processor 75.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications for implementing the functions of the system for generating an image map of a plurality of resident space objects in orbit around a celestial body as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, exemplary inventive computer-based systems/platforms, exemplary inventive computer-based devices, and/or exemplary inventive computer-based components of the present disclosure may be configured to handle numerous concurrent users or customer subscribers that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000

(e.g., but not limited to, 100,000,000-999,999,999), at least 1,000,000,000 (e.g., but not limited to, 1,000,000,000-999, 999,999,999), and so on.

In some embodiments, at least one database of exemplary databases 40 and 85 may be any type of database, including a database managed by a database management system (DBMS). In some embodiments, an exemplary DBMS-managed database may be specifically programmed as an engine that controls organization, storage, management, and/or retrieval of data in the respective database for implementing the functions of the system for generating an image map of a plurality of resident space objects in orbit around a celestial body. In some embodiments, the exemplary DBMS-managed database may be specifically programmed to provide the ability to query, backup and replicate, enforce rules, provide security, compute, perform change and access logging, and/or automate optimization for implementing the functions of the system for generating an image map of a plurality of resident space objects in orbit around a celestial body. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary inventive computer-based systems/platforms, the exemplary inventive computer-based devices, and/or the exemplary inventive computer-based components of the present disclosure may be specifically configured to operate in a cloud computing/ architecture such as, but not limiting to: infrastructure a service (IaaS), platform as a service (PaaS), and/or software as a service (SaaS).

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques for implementing the functions of the big data analytics, machine learning models and/or advanced algorithms (e.g., the celestial image feature generator 79 and/or related algorithms) that may be applied to the acquired image data in the celestial image feature mapping chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a system may include a plurality of satellites in orbit around a celestial body in at least one orbital plane. Each satellite from the plurality of satellites may include: at least one satellite processor; a non-transitory satellite computer memory; a satellite communication circuitry; at least one imaging device including: at least one imaging optical arrangement and a plurality of sensors; where the at least one imaging optical arrangement may be configured to have a field of view (FOV) to capture an image of a sky; where the image of the sky captured by the at least one imaging device within the FOV may include: at least one celestial image feature that is representative of at least one of: at least one other celestial body or at least one other celestial body and at least one resident space object (RSO); where the plurality of sensors may be configured to define a plurality of pixels to detect light through the at least one imaging optical arrangement and to generate image data of the image within the FOV; where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter; where the at least one satellite processor may be configured to: iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane; store celestial feature metadata in the non-transitory satellite computer memory for each image from the plurality of images; where the celestial feature metadata may include: the image data, a camera shutter open duration data, satellite system data, a sensor integration time data, and an acquisition timestamp data; and a central computing processing system that may include at least one centralized computing processor of at least one centralized computer; where the at least one centralized computing processor may be configured to: receive the celestial feature metadata of each image from the plurality of images from the plurality of satellites in orbit around the celestial body in the at least one orbital plane; and generate at least 1,000 celestial image features based on the celestial feature metadata from the plurality of images detected in a portion of the sky.

In some embodiments, the at least one celestial image feature may include at least one streak representative of the at least one other celestial body, the at least one resident space object (RSO) or any combination thereof.

In some embodiments, a length of the at least one streak may be based on a velocity of the at least one other celestial body, the at least one resident space object (RSO) or any combination thereof.

In some embodiments, an optical axis of the FOV may be positioned to point into space at a predefined pointing angle with respect to a tangential component of a satellite orbital velocity of each satellite. (e.g., angle α, angle β, and angle γ as shown in FIG. 2A)

In some embodiments, the at least one centralized computing processor may be configured to generate a catalog of the at least 1,000 celestial image features.

In some embodiments, the at least one centralized computing processor may be configured to generate an image map of the at least 1,000 celestial image features.

In some embodiments, each satellite from the plurality of satellites may further include an imaging device optics control circuitry for controlling for controlling the at least one imaging optical arrangement of the at least one imaging device, and an imaging device interface circuitry for receiving image data from the at least one imaging device.

In some embodiments, the at least one orbital plane may include at least one sun-synchronous orbital plane.

In some embodiments, the at least one centralized computer may be a base station computer.

In some embodiments, the celestial body may be Earth.

In some embodiments, the at least one centralized computing processor of the at least one centralized computer may include at least one particular satellite processor from the plurality of satellites.

In some embodiments, the at least one satellite processor may be configured to apply at least one sensor calibration parameter to the plurality of sensors.

In some embodiments, a method may include instructing a plurality of satellites in orbit around a celestial body in at least one orbital plane to store celestial feature metadata of each image from a plurality of images; where each satellite from the plurality of satellites may include: at least one satellite processor; a non-transitory satellite computer memory; a satellite communication circuitry; at least one imaging device including: at least one imaging optical arrangement and a plurality of sensors; where the at least one imaging optical arrangement may be configured to have a field of view (FOV) to capture an image of a sky; where the image of the sky captured by the at least one imaging device within the FOV may include: at least one celestial image feature that is representative of at least one of: at least one other celestial body or at least one other celestial body and at least one resident space object (RSO); where the plurality of sensors may be configured to define a plurality of pixels to detect light through the at least one imaging optical arrangement and to generate image data of the image within the FOV; where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter; instructing the at least one satellite processor to iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane; instructing the at least one satellite processor to store the celestial feature metadata in the non-transitory satellite computer memory for each image from the plurality of images; where the celestial feature metadata may include: the image data, a camera shutter open duration data, satellite system data, a sensor integration time data, and an acquisition timestamp data; instructing at least one centralized computer processor of at least one centralized computer to receive the celestial feature metadata of each image from the plurality of images from the plurality of satellites in orbit around the celestial body in the at least one orbital plane; and instructing the at least one centralized computer processor to generate at least 1,000 celestial image features based on the celestial feature metadata from the plurality of images detected in a portion of the sky.

In some embodiments, the at least one celestial image feature may include at least one streak representative of the at least one other celestial body, the at least one resident space object (RSO) or any combination thereof.

In some embodiments, a length of the at least one streak may be based on a velocity of the at least one other celestial body, the at least one resident space object (RSO) or any combination thereof.

In some embodiments, an optical axis of the FOV may be positioned to point into space at a predefined pointing angle with respect to a tangential component of a satellite orbital velocity of each satellite. (e.g., angle α, angle β, and angle γ as shown in FIG. 2A)

In some embodiments, the method may include instructing the at least one centralized computing processor to generate a catalog of the at least 1,000 celestial image features.

In some embodiments, the method may include instructing the at least one centralized computing processor to generate an image map of the at least 1,000 celestial image features.

In some embodiments, the method may further include: instructing the at least one satellite processor to control through an imaging device optics control circuitry, the at least one imaging optical arrangement of the at least one imaging device; and instructing the at least one satellite processor to receive through an imaging device interface circuitry, image data from the at least one imaging device.

In some embodiments, the at least one orbital plane may include at least one sun-synchronous orbital plane.

In some embodiments, the at least one centralized computer may be a base station computer.

In some embodiments, the celestial body may be Earth.

In some embodiments, the at least one centralized computing processor of the at least one centralized computer may include at least one particular satellite processor from the plurality of satellites.

In some embodiments, the at least one satellite processor may be configured to apply at least one sensor calibration parameter to the plurality of sensors.

In some embodiments, the method may further include instructing the at least one satellite processor to apply at least one sensor calibration parameter to the plurality of sensors.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described herein, various embodiments of the disclosure may be readily combined, without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

While a number of embodiments of the present disclosure have been described, it is understood that these embodiments are illustrative only, and not restrictive, and that many modifications may become apparent to those of ordinary skill in the art. For example, any dimensions discussed herein are provided as examples only, and are intended to be illustrative and not restrictive.

The invention claimed is:

1. A system, comprising:
a plurality of satellites in orbit around a celestial body in at least one orbital plane;
wherein each satellite from the plurality of satellites comprises:
at least one satellite processor;
a non-transitory satellite computer memory;
a satellite communication circuitry;
at least one imaging optical arrangement and
a plurality of sensors;
wherein the at least one imaging optical arrangement is configured to have a field of view (FOV) to capture an image of a sky;
wherein the image of the sky captured by the at least one imaging device within the FOV comprises:
at least one celestial image feature that is representative of at least one resident space object (RSO);
wherein the plurality of sensors is configured to define a plurality of pixels to detect light through the at least one imaging optical arrangement and to generate image data of the image within the FOV;
wherein the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter;
wherein the at least one satellite processor is configured to:
iteratively receive, from the plurality of sensors, the image data of a plurality of images generated by detected light from the at least one RSO located within the FOV at a predefined image acquisition rate in a volume of the sky as the FOV of the at least one imaging device on each satellite moves in one of the at least one orbital plane;
store celestial feature metadata in the non-transitory satellite computer memory for each image from the plurality of images;
wherein the celestial feature metadata comprising:
the image data,
a camera shutter open duration data,
satellite system data,
a sensor integration time data, and
an acquisition timestamp data; and
a central computing processing arrangement comprising at least one centralized computing processor of at least one centralized computer;
wherein the at least one centralized computing processor is configured to:
receive the celestial feature metadata of each image from the plurality of images from the plurality of satellites in orbit around the celestial body in the at least one orbital plane; and
generate at least 1,000 celestial image features based on the celestial feature metadata from the plurality of images detected in a portion of the sky.

2. The system according to claim 1, wherein the at least one celestial image feature comprises at least one streak representative of at least one other celestial body, the at least one resident space object (RSO) or any combination thereof;
wherein a length of the at least one streak is based on a velocity of the at least one other celestial body, the at least one resident space object (RSO) or any combination thereof;
wherein an optical axis of the FOV is positioned at a predefined pointing angle with respect to a tangential component of a satellite orbital velocity of each satellite.

3. The system according to claim 1, wherein the at least one centralized computing processor is further configured to identify at least one identified RSO in the plurality of images by comparing the image data in the celestial feature metadata of the plurality of images with data stored in a RSO repository database.

4. The system according to claim 3, wherein the at least one centralized computing processor is further configured to update the data stored in the RSO repository database with the at least one identified RSO in the plurality of images.

5. The system according to claim 1, wherein the at least one centralized computing processor is configured to generate a catalog of the at least 1,000 celestial image features.

6. The system according to claim 1, wherein the at least one centralized computing processor is configured to generate an image map of the at least 1,000 celestial image features.

7. The system according to claim 1, wherein each satellite from the plurality of satellites further comprises: an imaging device optics control circuitry for controlling the at least one imaging optical arrangement of the at least one imaging device; and an imaging device interface circuitry for receiving image data from the at least one imaging device.

8. The system according to claim 1, wherein the at least one orbital plane comprises at least one sun-synchronous orbital plane.

9. The system according to claim 1, wherein the at least one centralized computing processor of the at least one centralized computer is: a base station computer processor of a base station computer, at least one particular satellite processor from the plurality of satellites, or both.

10. The system according to claim 1, wherein the celestial body is Earth.

11. The system according to claim 1, wherein each satellite further comprises a motorized gimbal coupled to the at least one imaging device; and wherein the at least one satellite processor is configured to program the motorized gimbal to change a pointing angle of the field of view (FOV) of the at least one imaging optical arrangement.

12. A method, comprising:
instructing a plurality of satellites in orbit around a celestial body in at least one orbital plane to store celestial feature metadata of each image from a plurality of images;
wherein each satellite from the plurality of satellites comprises:
at least one satellite processor;
a non-transitory satellite computer memory;
a satellite communication circuitry;
at least one imaging device comprising:
at least one imaging optical arrangement and
a plurality of sensors;
wherein the at least one imaging optical arrangement is configured to have a field of view (FOV) to capture an image of a sky;
wherein the image of the sky captured by the at least one imaging device within the FOV comprises:
at least one celestial image feature that is representative of at least one resident space object (RSO);
wherein the plurality of sensors is configured to define a plurality of pixels to detect light through the at least one imaging optical arrangement and to generate image data of the image within the FOV;
wherein the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter;
instructing the at least one satellite processor to iteratively receive, from the plurality of sensors, the image data of a plurality of images generated by detected light from the at least one RSO located within the FOV at a predefined image acquisition rate in a volume of the sky as the FOV of the at least one imaging device on each satellite moves in one of the at least one orbital plane;
instructing the at least one satellite processor to store the celestial feature metadata in the non-transitory satellite computer memory for each image from the plurality of images;
wherein the celestial feature metadata comprising:
the image data,
a camera shutter open duration data,
satellite system data,
a sensor integration time data, and
an acquisition timestamp data;
instructing at least one centralized computer processor of at least one centralized computer of a central computing processing arrangement to receive the celestial feature metadata of each image from the plurality of images from the plurality of satellites in orbit around the celestial body in the at least one orbital plane; and
instructing the at least one centralized computer processor to generate at least 1,000 celestial image features based on the celestial feature metadata from the plurality of images detected in a portion of the sky.

13. The method according to claim 12, wherein the at least one celestial image feature comprises at least one streak representative of at least one other celestial body, the at least one resident space object (RSO) or any combination thereof;
wherein a length of the at least one streak is based on a velocity of the at least one other celestial body, the at least one resident space object (RSO) or any combination thereof;
wherein an optical axis of the FOV is positioned at a predefined pointing angle with respect to a tangential component of a satellite orbital velocity of each satellite.

14. The method according to claim 12, further comprising instructing the at least one centralized computer processor of at least one centralized computer of a central computing processing arrangement to identify at least one identified RSO in the plurality of images by comparing the image data in the celestial feature metadata of the plurality of images with data stored in a RSO repository database.

15. The method according to claim 14, further comprising instructing the at least one centralized computer processor of at least one centralized computer of a central computing processing arrangement to update the data stored in the RSO repository database with the at least one identified RSO in the plurality of images.

16. The method according to claim 12, further comprising instructing the at least one centralized computer processor to generate a catalog of the at least 1,000 celestial image features.

17. The method according to claim 12, further comprising instructing the at least one centralized computer processor to generate an image map of the at least 1,000 celestial image features.

18. The method according to claim 12, further comprising: instructing the at least one satellite processor to control through an imaging device optics control circuitry, the at least one imaging optical arrangement of the at least one imaging device; and instructing the at least one satellite processor to receive through an imaging device interface circuitry, image data from the at least one imaging device.

19. The method according to claim 12, wherein the at least one orbital plane comprises at least one sun-synchronous orbital plane.

20. The method according to claim 12, wherein the at least one centralized computer processor of the at least one centralized computer is: a base station computer processor of a base station computer, at least one particular satellite processor from the plurality of satellites, or both.

21. The method according to claim 12, wherein the celestial body is Earth.

22. The method according to claim 12, further comprising instructing the at least one satellite processor to program a motorized gimbal coupled to the at least one imaging device to change a pointing angle of the field of view (FOV) of the at least one imaging optical arrangement.

* * * * *